United States Patent
Rajan et al.

(10) Patent No.: US 11,232,522 B2
(45) Date of Patent: *Jan. 25, 2022

(54) METHODS, SYSTEMS AND TECHNIQUES FOR BLENDING ONLINE CONTENT FROM MULTIPLE DISPARATE CONTENT SOURCES INCLUDING A PERSONAL CONTENT SOURCE OR A SEMI-PERSONAL CONTENT SOURCE

(71) Applicant: Verizon Media Inc., New York, NY (US)

(72) Inventors: Suju Rajan, Sunnyvale, CA (US); Liangjie Hong, Santa Clara, CA (US); Nathan Liu, Sunnyvale, CA (US); Scott Gaffney, Palo Alto, CA (US)

(73) Assignee: VERIZON MEDIA INC., New York, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/875,186

(22) Filed: Oct. 5, 2015

(65) Prior Publication Data

US 2017/0098283 A1   Apr. 6, 2017

(51) Int. Cl.
*G06F 16/951* (2019.01)
*G06Q 50/00* (2012.01)
*H04L 12/58* (2006.01)

(52) U.S. Cl.
CPC .......... *G06Q 50/01* (2013.01); *G06F 16/951* (2019.01); *H04L 51/32* (2013.01)

(58) Field of Classification Search
CPC .............. G06Q 10/10; G06Q 10/107; G06F 17/30613; G06F 16/256; G06F 16/258

See application file for complete search history.

(56) References Cited

U.S. PATENT DOCUMENTS

| | | | | |
|---|---|---|---|---|
| 2002/0183936 A1* | 12/2002 | Kulp | ............... | G16B 50/00 702/19 |
| 2005/0065952 A1* | 3/2005 | Dettinger | ............. | G06F 16/258 |
| 2005/0223061 A1* | 10/2005 | Auerbach | ............ | G06Q 10/107 709/206 |
| 2010/0241620 A1 | 9/2010 | Manister et al. | | |
| 2013/0339137 A1* | 12/2013 | Lempel | ................ | G06Q 30/02 705/14.49 |

(Continued)

OTHER PUBLICATIONS

Office Action dated Dec. 1, 2017 in U.S. Appl. No. 14/875,219.

(Continued)

*Primary Examiner* — William Spieler
(74) *Attorney, Agent, or Firm* — Venable LLP

(57) ABSTRACT

The present teaching, which includes methods, systems and computer-readable media, relates to providing content from multiple disparate sources including a person's personal data sources and non-personal data sources. The disclosed techniques may include receiving a request for content from a person; obtaining first content from a first source private to the person based on the request; obtaining second content from at least one second source based on the request; blending the first content from the first source and the second content from the at least one second source to generate a blended content; and providing the blended content to the person in response to the request.

25 Claims, 25 Drawing Sheets

(56) References Cited

U.S. PATENT DOCUMENTS

| | | | |
|---|---|---|---|
| 2013/0345971 A1* | 12/2013 | Stamm | G01C 21/00 701/465 |
| 2014/0095550 A1 | 4/2014 | Rantanen et al. | |
| 2015/0052168 A1* | 2/2015 | Sharifi | G06F 16/7834 707/769 |
| 2015/0169701 A1* | 6/2015 | Stekkelpak | G06F 16/903 707/723 |
| 2016/0357755 A1 | 12/2016 | Douglas et al. | |
| 2017/0228658 A1 | 8/2017 | Lim et al. | |

OTHER PUBLICATIONS

Office Action dated Jul. 12, 2018 in U.S. Appl. No. 14/875,219.
Notice of Allowance dated Apr. 3, 2019 in U.S. Appl. No. 14/875,219.
Office Action dated Oct. 6, 2020 in U.S. Appl. No. 16/510,042.
Notice of Allowanced dated Mar. 19, 2021 in U.S. Appl. No. 16/510,042.

* cited by examiner

METHODS, SYSTEMS AND TECHNIQUES FOR BLENDING ONLINE CONTENT FROM MULTIPLE DISPARATE CONTENT SOURCES INCLUDING A PERSONAL CONTENT SOURCE OR A SEMI-PERSONAL CONTENT SOURCE

CROSS-REFERENCE TO RELATED APPLICATIONS

The present application is related to U.S. application Ser. No. 14/875,219, filed on Oct. 5, 2015, entitled METHODS, SYSTEMS AND TECHNIQUES FOR RANKING BLENDED CONTENT RETRIEVED FROM MULTIPLE DISPARATE CONTENT SOURCES, and U.S. application Ser. No. 16/510,042, filed on Jul. 12, 2019, entitled METHODS, SYSTEMS AND TECHNIQUES FOR RANKING BLENDED CONTENT RETRIEVED FROM MULTIPLE DISPARATE CONTENT SOURCES, which are incorporated herein by reference in their entireties.

BACKGROUND

1. Technical Field

The present teaching generally relates to organizing, retrieving, presenting, and utilizing information. Specifically, the present teaching relates to methods and systems for blending and ranking of information from multiple disparate sources including a person's personal data sources and non-personal data sources.

2. Discussion of Technical Background

The Internet has made it possible for a person to electronically access virtually any content at any time and from any location. The Internet technology facilitates information publishing, information sharing, and data exchange in various spaces and among different persons. One problem associated with the rapid growth of the Internet is the so-called "information explosion," which is the rapid increase in the amount of available information and the effects of this abundance. As the amount of available information grows, the problem of managing the information becomes more difficult, which can lead to information overload. With the explosion of information, it has become more and more important to provide users with information from a public space that is relevant to the individual person and not just information in general.

In addition to the public space such as the Internet, semi-private spaces including social media and data sharing sites have become another important source where people can obtain and share information in their daily lives. The continuous and rapid growth of social media and data sharing sites in the past decade has significantly impacted the lifestyles of many; people spend more and more time on chatting and sharing information with their social connections in the semi-private spaces or use such semi-private sources as additional means for obtaining information and entertainment. Similar to what has happened in the public space, information explosion has also become an issue in the social media space, especially in managing and retrieving information in an efficient and organized manner.

Private space is another data source used frequently in people's everyday lives. For example, personal emails in Yahoo! mail, Gmail, Outlook etc. and personal calendar events are considered as private sources because they are only accessible to a person when she or he logs in using private credentials. Although most information in a person's private space may be relevant to the person, it is organized in a segregated manner. For example, a person's emails may be organized by different email accounts and stored locally in different email applications or remotely at different email servers. As such, to get a full picture of some situation related to, e.g., some event, a person often has to search different private spaces to piece everything together. For example, to check with a friend of the actual arrival time for a dinner, one may have to first check a particular email (in the email space) from the friend indicating the time the friend will arrive, and then go to Contacts (a different private space) to search for the friend's contact information before making a call to the friend to confirm the actual arrival time. This is not convenient.

The segregation of information occurs not only in the private space, but also in the semi-private and public spaces. This has led to another consequential problem given the information explosion: requiring one to constantly look for information across different segregated spaces to piece everything together due to lack of meaningful connections among pieces of information that are related in actuality yet isolated in different segregated spaces.

Efforts have been made to organize the huge amount of available information to assist a person to find the relevant information. Conventional scheme of such effort is application-centric and/or domain-centric. Each application carves out its own subset of information in a manner that is specific to the application and/or specific to a vertical or domain. For example, such attempt is either dedicated to a particular email account (e.g., www.Gmail.com) or specific to an email vertical (e.g., Outlook); a traditional web topical portal allows users to access information in a specific vertical, such as www.IMDB.com in the movies domain and www.ESPN.com in the sports domain. In practice, however, a person often has to go back and forth between different applications, sometimes across different spaces, in order to complete a task because of the segregated and unorganized nature of information existing in various spaces. Moreover, even within a specific vertical, the enormous amount of information makes it tedious and time consuming to find the desired information.

Another line of effort is directed to organizing and providing information in an interest-centric manner. For example, user groups of social media in a semi-private space may be formed by common interests among the group members so that they can share information that is likely to be of interest to each other. Web portals in the public space start to build user profiles for individuals and recommend content based on an individual person's interests, either declared or inferred. The effectiveness of interest-centric information organization and recommendation is highly relied on the accuracy of user profiling. Oftentimes, however, a person may not like to declare her/his interests, whether in a semi-private space or a public space. In that case, the accuracy of user profiling can only be relied on estimation, which can be questionable. Accordingly, neither of the application-centric, domain-centric, and interest-centric ways works well in dealing with the information explosion challenge.

FIG. 1 depicts a traditional scheme of information organization and retrieval in different spaces in a segregated and disorganized manner. A person 102 has to interact with information in private space 104, semi-private space 106, and public space 108 via unrelated and separate means 110, 112, 114, respectively. For accessing private data from the private space 104, means 110, such as email applications, email sites, local or remote Contacts and calendars, etc., has to be selected and used. Each means 110 is domain or application-oriented, allowing the person 102 to access information related to the domain with the specific application that the means 110 is developed for. Even for information residing within different applications/domains in the private space 104, a person 102 still has to go by different means 110 to access content of each application/domain, which is not convenient and not person-centric. For example, in order to find out the phone numbers of attendees of a birthday party, the person 102 has to first find all the confirmation emails from the attendees (may be sent in different emails and even to different email accounts), write down each name, and open different Contacts to look for their phone numbers.

Similarly, for interacting with the semi-private space 106, a person 102 needs to use a variety of means 112, each of which is developed and dedicated for a specific semi-private data source. For example, Facebook desktop application, Facebook mobile app, and Facebook site are all means for accessing information in the person 102's Facebook account. But when the person 102 wants to open any document shared on Dropbox by a Facebook friend, the person 102 has to switch to another means dedicated to Dropbox (a desktop application, a mobile app, or a website). As shown in FIG. 1, information may be transmitted between the private space 104 and the semi-private space 106. For instance, private photos can be uploaded to a social media site for sharing with friends; social media or data sharing sites may send private emails to a person 102's private email account notifying her/him of status updates of social friends. However, such information exchange does not automatically create any linkage between data between the private and semi-private spaces 104, 106. Thus, there is no application that can keep track of such information exchange and establish meaningful connections, much less utilizing the connections to make it easier to search for information.

As to the public space 108, means 114 such as traditional search engines (e.g., www.Google.com) or web portals (e.g., www.CNN.com, www.AOL.com, www.IMDB.com, etc.) are used to access information. With the increasing challenge of information explosion, various efforts have been made to assist a person 102 to efficiently access relevant and on-the-point content from the public space 108. For example, topical portals have been developed that are more domain-oriented as compared to generic content gathering systems such as traditional search engines. Examples include topical portals on finance, sports, news, weather, shopping, music, art, movies, etc. Such topical portals allow the person 102 to access information related to subject matters that these portals are directed to. Vertical search has also been implemented by major search engines to help to limit the search results within a specific domain, such as images, news, or local results. However, even if limiting the search result to a specific domain in the public space 108, there is still an enormous amount of available information, putting much burden on the person 102 to identify desired information.

There is also information flow among the public space 108, the semi-private space 106, and the private space 104. For example, www.FedeEx.com (public space) may send a private email to a person 102's email account (private space) with a tracking number; a person 102 may include URLs of public websites in her/his tweets to followers. However, in reality, it is easy to lose track of related information residing in different spaces. When needed, much effort is needed to dig them out based on memory via separate means 110, 112, 114 across different spaces 104, 106, 108. In today's society, this consumes more and more people's time.

Because information residing in different spaces or even within the same space is organized in a segregated manner and can only be accessed via dedicated means, the identification and presentation of information from different sources (whether from the same or different spaces) cannot be made in a coherent and unified manner. For example, when a person 102 searches for information using a query in different spaces, the results yielded in different search spaces are different. For instance, search result from a conventional search engine directed to the public space 108 is usually a search result page with "blue links," while a search in the email space based on the same query will certainly look completely different. When the same query is used for search in different social media applications in the semi-private space 106, each application will again likely organize and present the search result in a distinct manner. Such inconsistency affects user experience. Further, related information residing in different sources is retrieved piece meal so that it requires the person 102 to manually connect the dots provide a mental picture of the overall situation.

Therefore, there is a need for improvements over the conventional approaches to organize, retrieve, present, and utilize information.

SUMMARY

The present teaching relates to methods, systems, and programming for blending and ranking of information from multiple disparate sources including a person's personal data sources and non-personal data sources.

In one example, a method, implemented on at least one computing device each of which has at least one processor, storage, and a communication platform connected to a network for providing content, is disclosed. The method may include receiving a request for content from a person; obtaining first content from a first source private to the person based on the request; obtaining second content from at least one second source based on the request; blending the first content from the first source and the second content from the at least one second source to generate a blended content; and providing the blended content to the person in response to the request.

In another example, a system having at least one processor, storage, and a communication platform, to provide content, is disclosed. The system may include an input request processing unit, a first content retriever, a second content retriever, and a blending engine. The input request processing unit may be implemented on the at least one processor and configured to receive a request for content from a person. The first content retriever may be implemented on the at least one processor and configured to obtain first content from a first source private to the person based on the request. The second content retriever may be implemented on the at least one processor and configured to obtain second content from at least one second source based on the request. The blending engine may be implemented on the at least one processor and configured to: blend the first content from the first source and the second content from the at least one second source to generate a blended content, and provide the blended content to the person in response to the request.

Other concepts relate to software to implement the present teachings on providing blended and ranked content. A software product, in accord with this concept, includes at least one machine-readable non-transitory medium and information carried by the medium. The information carried by the medium may be executable program code data, parameters in association with the executable program code, and/or information related to a user, a request/query, content, or information related to a social group, etc.

In one example, a machine-readable, non-transitory and tangible medium having data recorded thereon to provide blended content, when read by the machine, causes the machine to perform a plurality of operations. Such operations may include receiving a request for content from a person; obtaining first content from a first source private to the person based on the request; obtaining second content from at least one second source based on the request; blending the first content from the first source and the second content from the at least one second source to generate a blended content; and providing the blended content to the person in response to the request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

The present teaching describes methods, systems, and programming aspects of efficiently and effectively organizing, retrieving, presenting, and utilizing information.

Figure 1:
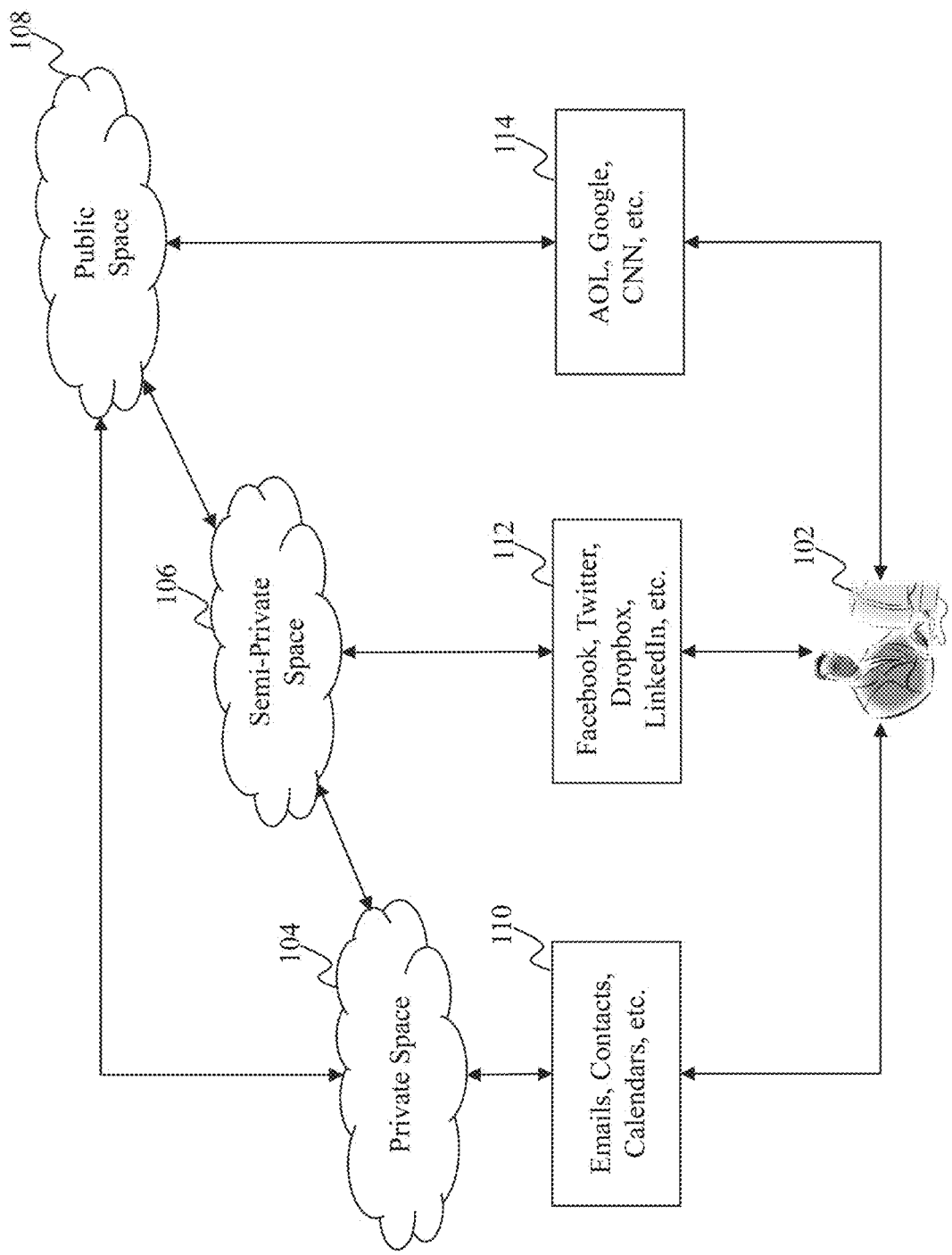
FIG. 1 (prior art) depicts a traditional scheme of information organization and retrieval from different spaces in a segregated and disorganized manner.
Figure 2:
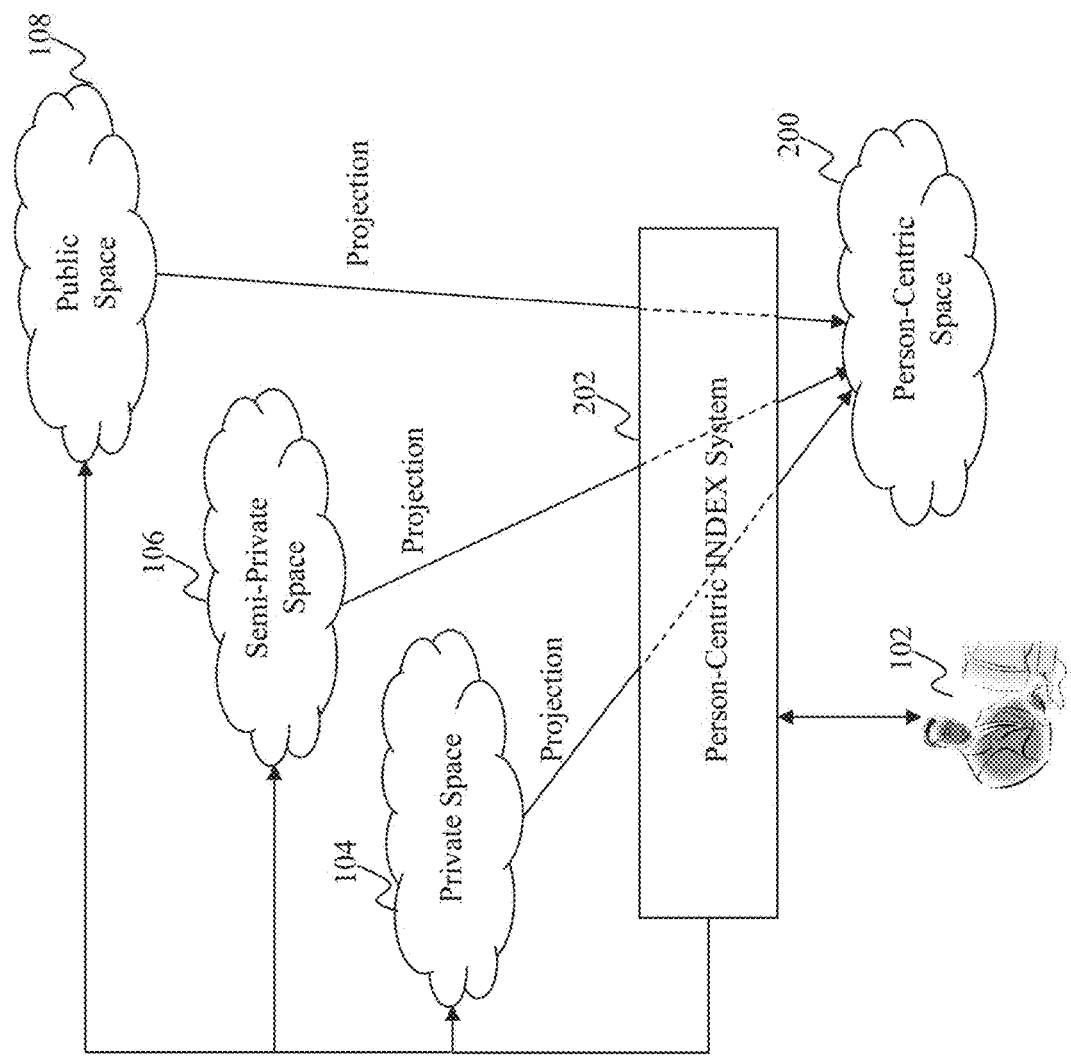
FIG. 2 depicts a novel scheme of building a person-centric space for a person by cross-linking data from different spaces and applications thereof, according to an embodiment of the present teaching.

FIG. 2 depicts a novel scheme of building a person-centric space 200 for a person 102 by cross-linking data from different spaces and applications thereof, according to an embodiment of the present teaching. Unlike the traditional approach to organize information in different spaces in a segregated and disorganized manner, as illustrated in FIG. 1, FIG. 2 provides a person-centric INDEX system 202, which builds the person-centric space 200 specific to the person 102 by digesting information from the public space 108, semi-private space 106, and private space 104 and cross-linking relevant data from those spaces 104, 106, 108. As described herein, a person 102 referred herein may include a human being, a group of people, an organization such as a business department or a corporation, or any unit that can use the person-centric INDEX system 202. A space, whether private, semi-private, or public, may be a collection of information in one or more sources. Through the person-centric INDEX system 202, information relevant to the person 102 from each of the private, semi-private, and public spaces 104, 106, and 108 is projected, into the person-centric space 200 in a meaningful manner. That is, a part of the data in the person-centric space 200 is projected from the public space 108 in a manner relevant to the person 102; a part of the data in the person-centric space 200 is projected from the semi-private space 106 in a manner relevant to the person 102; a part of the data in the person-centric space 200 is projected from the private space 104. Thus, the person-centric space 200 is an information universe meaningful to the person 102 and formed from the perspective of the person 102.

Different from conventional approaches, which organize information in an application-centric, domain-centric, or interest-centric manner, the person-centric INDEX system 202 recognizes relevant information from the enormous information available in the public space 108, semi-private space 106, and private space 104 in accordance with the perspective of the person 102, thereby filtering out information that is not relevant to the person 102, assisting the person 102 to make sense out of the relevance among different pieces of information in the person-centric space. The person-centric space 200 is dynamic and changes with the online (possibly offline) activities of the person 102. For example, the person 102 can search more content via the person-centric INDEX system 202 (this function may be similar to conventional search engine) that will lead to the continuously expansion of the person-centric space 200. The person-centric INDEX system 202 can cross-link data across information different spaces, or information from different sources in the same space. For instance, by identifying a FedEx tracking number in an order confirmation email sent to a personal email account from www.Amazon.com, the person-centric INDEX system 202 can automatically search for any information in any space that is relevant to the tracking number, such as package delivery status information from www.FedEx.com in the public space 108. Although most information from www.FedEx.com may not be related to the person 102, the particular package delivery status information relevant to the person 102 and can be retrieved by the person-centric INDEX system 202 and indexed against the information from the person 102's private emails. In other words, the package delivery status information, even though from the public space 108, can be projected into the person-centric space 200 and, together with other information in the person-centric space 200 (such as a confirmation email related to the package), the person-centric INDEX system 202 integrates relevant information from different sources to yield unified and semantically meaningful information, such as a card related to an order incorporating the name of the ordered item, the name of the person who ordered it, the name of the company that is to deliver the item, as well as the current delivery status.

In another example, when a private email reminding of an upcoming soccer game from a coach is received, the person-centric INDEX system 202 may be triggered to process the private email and identify, based on the content of the email, certain information in the sports domain such as date/time, location, and players and coaches of the soccer game and cross link the email with such information. The person-centric INDEX system 202 may also retrieve additional relevant information from other data sources, such as phone number of the coach from Contacts of the person 102. The person-centric INDEX system 202 may also retrieve map and directions to the soccer game stadium from Google Maps based on the location information and retrieve weather forecast of the game from www.Weather.com based on the date. If the coach is connected with the person 102 in any social media, then the person-centric INDEX system 202 may go to the social media site in the semi-private space 106 to retrieve any content made by the coach that is relevant to the soccer game. In this example, all those different pieces of information from the public space 108, semi-private space 106, and private space 104 are cross-linked and projected to the person-centric space 200 in accordance with the person 102's perspective on the soccer game.

The person-centric INDEX system 202 may build the initial person-centric space 200 when the person 102 first time accesses the person-centric INDEX system 202. By analyzing all the information in the private space 104 which the person 102 has granted access permission, the person-centric INDEX system 202 can identify, retrieve, and link relevant information from the public space 108, semi-private space 106, and private space 104 and project them into the person-centric space 200. As mentioned above, the person-centric INDEX system 202 also maintains and updates the person-centric space 200 in a continuous or dynamic manner. In one example, the person-centric INDEX system 202 may automatically check any change, either in the private space 104 or otherwise, based on a schedule and initiates the update of the person-centric space 200 when necessary. For example, every two hours, the person-centric INDEX system 202 may automatically check any new email that has not been analyzed before. In another example, the person-centric INDEX system 202 may automatically check any change occurring in the public space 108 and the semi-private space 106 that is relevant to the person 102. For instance, in the soccer game example descried above, every day before the scheduled soccer game, the person-centric INDEX system 202 may automatically check www.Weather.com to see if the weather forecast needs to be updated. The person-centric INDEX system 202 may also update the person-centric space 200 responsive to some triggering event that may affect any data in the person-centric space 200. For example, in the FedEx package example described above, once the scheduled delivery date has passed or a package delivery email has been received, the person-centric INDEX system 202 may update the person-centric space 200 to remove the temporary relationship between the person 102 and www.FedEx.com until a new connection between them is established again in the future. The triggering event is not limited to events happening in the public space 108, semi-private space 106, or private space 104, but can include any internal operation of the person-centric INDEX system 202. As an example, every time the person-centric INDEX system 202 performs a search in response to a query or to answer a question, it may also trigger the person-centric INDEX system 202 to update the person-centric space 200 based on, e.g., newly retrieved information related to, e.g., a search result or some answers. When the search result or answers cannot be found in the person-centric space 200, the person-centric INDEX system 202 may also update the person-centric space 200 to include those search results and answers. That is, the person-centric INDEX system 202 may dynamically update the person-centric space 200 in response to any suitable triggering events.

To better understand information in the person-centric space 200 and make it meaningful, the person-centric INDEX system 202 may further build a person-centric knowledge database including person-centric knowledge by extracting and associating data about the person 102 from the person-centric space 200. The person-centric INDEX system 202 can extract entities related to the person 102 and infer relationships between the entities without the person 102's explicit declaration. A person-centric knowledge representation for the person 102 can be created by person-centric INDEX system 202 the based on the entities and relationships. The inference can be based on any information in the person-centric space 200. The knowledge elements that can be inferred or deduced may include the person 102's social contacts, the person 102's relationships with places, events, etc.

In order to construct the person-centric knowledge representation, the person-centric INDEX system 202 may extract entities from content in the person 102's person-centric space 200. These entities can be places like restaurants or places of interest, contact mentions like names, emails, phone numbers or addresses, and events with date, place and persons involved. In addition to extracting these mentions, the person-centric INDEX system 202 can resolve them to what they refer to (i.e. can disambiguate an extracted entity when it may refer to multiple individuals). For example, a word "King" in a private email may refer to a title of a person who is the King of a country or refer to a person's last name. The person-centric INDEX system 202 may utilize any information in the person-centric space 200 to determine what type of entity the word "King" refers to in the email. In addition to determining an entity type for an extracted entity name, the person-centric INDEX system 202 may also determine a specific individual referred to by this entity name. As one instance, a person's first name may refer to different contacts, and a same restaurant name can refer to several restaurants. The person-centric INDEX system 202 can make use of contextual information and/or textual metadata associated with the entity name in the email to disambiguate such cases, thereby providing a high precision resolution. With the precise disambiguation, the person-centric INDEX system 202 can find right information from unstructured personal data and provide it in a structured way (e.g. in a graph associated with the person 102). In contrast to a conventional personal profile, the person-centric INDEX system 202 generates a single personal graph for an individual to encompass connections, interests, and events associated with the person 102. It can be understood that a person-centric knowledge may also be represented in a format other than a graph.

The person-centric INDEX system 202, in conjunction with the person-centric space 200, may organize related information from different sources and provide the information to a person 102 in a user-friendly, unified presentation style. In addition to providing requested information in any known format, such as hyperlinks on a search results page, the person-centric INDEX system 202 may present information in intent-based cards. Unlike existing entity-based search results cards organizing results based on an entity, the person-centric INDEX system 202 may focus on a person 102's intent to dynamically build a card for the person 102. The intent may be explicitly specified in the query, or estimated based on the context, trending events, or any knowledge derived from the person-centric space 200. Knowing the person 102's intent when the card is created to answer the query, the person-centric INDEX system 202 can provide relevant information on the card. The relevant information may include partial information associated with the entity in the query, and/or additional information from the person-centric space 200 that is related to the person's intent. In the soccer game example descried above, in response to the person's query or question related to the soccer game, the person-centric INDEX system 202 may estimate the person's intent is to know the date/time of the game and thus, build a card that includes not only the direct answer of the date/time but also other information related to the soccer game in the person-centric space 200, such as the map and directions, weather forecast, and contact information of the coach.

In one embodiment, knowing the current intent of the person 102, the person-centric INDEX system 202 can anticipate the next intent of the person 102, such that the current card provided by the person-centric INDEX system 202 can lead to next steps. For example, the person-centric INDEX system 202 can anticipate that after looking at the show times of a new movie, the person 102 will be likely to buy tickets. In another embodiment, focusing on the person 102's intent, the person-centric INDEX system 202 can answer the person 102 with a card even when there is no entity in the query or request (i.e., in a query-less or anticipatory use case). For example, if the person-centric INDEX system 202 determines that the person 102 has a behavior pattern of searching traffic information from work place to home at 5 pm on workdays, then from now on, the person-centric INDEX system 202 may automatically generate and provide a notice card to the person 102 at around 5 pm on every workday, to notify the person 102 about the traffic information regardless whether a query is received from the person 102.

The person-centric INDEX system 202 can be used for both building the person-centric space 200 for a person 102 and facilitating the person 102 to apply the person-centric space 200 in a variety for applications. Instead of using different means 110, 112, 114 shown in FIG. 1 to access different data sources across different spaces, the person-centric INDEX system 202 can serve as a centralized interface between the person 102 and her/his own person-centric space 200, thereby reducing the time and efforts spent by the person 102 on retrieving desired information or any other applications. As different pieces of relevant information from the public space 108, semi-private space 106, and private space 104 have been projected to the person-centric space 200 in a well-organized way, they can be handled by a single person-centric INDEX system 202, thereby improving the efficiency and effectiveness in finding the desired information. For example, in the FedEx package example described above, any time the person wants to know the current status of the package, she/he no longer needs to dig out the email with the tracking number, write down the tracking number, and open www.FedEx.com in a browser and type in the tracking number. The person-centric INDEX system 202 may have already stored the package status information since the time when the initial order email was received and have kept updating the package status information in the person-centric space 200. So any time when the person 102 inputs a request for package status update, either in the form of a search query or a question n, the person-centric INDEX system 202 can go directly to retrieve the updated package status information from the person-centric space 200 or automatically call the tracking application programming interface (API) of FedEx server with the stored tracking number for the current status update. The result is then provided to the person 102 without any additional efforts made by the person 102. In some embodiments, the person 102 may not even need to explicitly request the status update. Responsive to receiving the order confirmation email, the person-centric INDEX system 202 may automatically set up a task to regularly send the status update to the person 102 until the package is delivered or may dynamically notify the person 102 with any event, like if the package is delayed or lost.

In one aspect of the present teaching, the person-centric INDEX system 202, in conjunction with the person-centric space 200, can be used for answering questions. To achieve this, the person-centric INDEX system 202 may classify a question from a person 102 into a personal question or a non-personal question. In some embodiment, data from the person-centric space 200 may be for classification. For example, a question related to "uncle Sam" may be classified as a personal question if "uncle Sam" is a real person identified from the private contact list. Once the question is classified as personal, the person-centric INDEX system 202 may extract various features including entities and relationships from the question. The extracted entities and relationships may be used by the person-centric INDEX system 202 to traverse a person-centric knowledge database derived from the person-centric space 200. In some embodiments, the person-centric knowledge database may store data in a triple format including one or more entities and a relationships between the one or more entities. When an exact match of relationship and entity are found, an answer is returned. When there is no exact match, a similarity between the question and answer triples is taken into consideration and used to find the candidate answers. In the "uncle Sam" example described above, if the question is "where is uncle Sam," the person-centric INDEX system 202 may search the person-centric knowledge database for any location entity that has a valid relationship with the entity "uncle Sam." In one example, a recent email may be sent by "uncle Sam," and the email may also mention that he will be attending a conference on these days. The location of the conference can be retrieved from the conference website in the public space 108, stored in the person-centric space 200, and associated with entity "uncle Sam." Based on the relationship, the person-centric INDEX system 202 can answer the question with the location of the conference. The person-centric INDEX system 202 thus provides an efficient solution to search for answers to personal questions and increases user engagement and content understanding.

In another aspect of the present teaching, the person-centric INDEX system 202, in conjunction with the person-centric space 200, can be used for task completion. Task completion often involves interactions with different data sources across different spaces. A task such as "making mother's day dinner reservation" involves task actions such as identifying who is my mother, checking what date is mother's day this year, finding out a mutually available time slot on mother's day for my mother and me, picking up a restaurant that my mother and I like, making an online reservation on the restaurant's website, etc. Traditionally, in order to complete each task action, a person 102 has to open a number of applications to access information from different sources across different spaces and perform a series of tedious operations, such as searching for "mother's day 2015" in a search engine, checking my own calendar and mother's shared calendar, digging out past emails about the restaurant reservations for dinners with my mother, making online reservation via a browser, etc. In contrast to the traditional approaches for task completion, the person-centric INDEX system 202 can complete the same task more efficiently and effectively because all pieces of information related to mother's day dinner reservation have already been projected to the person-centric space 200. This makes automatic task generation and completion using the person-centric INDEX system 202 become possible. In response to receiving an input of "making mother's day dinner reservation" from a person 102, the person-centric INDEX system 202 can automatically generate the list of task actions as mentioned above and execute each of them based on information from the person-centric space 200 and update the person 102 with the current status of completing the task.

With the dynamic and rich information related to the person 102 that is available in the person-centric space 200, the person-centric INDEX system 202 can even automatically generate a task without any input from the person 102. In one embodiment, anytime a card is generated and provided to the person 102, the information on the card may be analyzed by the person-centric INDEX system 202 to determine whether a task needs to be generated as a follow-up of the card. For example, once an email card summarizing an online order is constructed, the person-centric INDEX system 202 may generate a task to track the package status until it is delivered and notify any status update for the person 102. In another embodiment, any event occurring in the public space 108, semi-private space 106, or private space 104 that is relevant to the person 102 may trigger the task completion as well. For instance, a flight delay message on an airline website in the public space 108 may trigger generation of a task for changing hotel, rental car, and restaurant reservations in the same trip. In still another embodiment, the person 102's past behavior patterns may help the person-centric INDEX system 202 to anticipate her/his intent in the similar context and automatically generate a task accordingly. As an instance, if the person 102 always had a dinner with her/his mother on mother's day at the same restaurant, a task may be generated by the person-centric INDEX system 202 this year, in advance, to make the mother's day dinner reservation at the same restaurant.

It is understood that in some occasions, certain task actions may not be completed solely based on information from the person-centric space 200. For example, in order to complete the task "sending flowers to mom on mother's day," flower shops need to be reached out to. In one embodiment of the present teaching, a task exchange platform may be created to facilitate the completion of tasks. The person-centric INDEX system 202 may send certain tasks or task actions to the task exchange platform so that parties interested in completing the task may make bids on it. The task exchange platform alone, or in conjunction with the person-centric INDEX system 202, may select the winning bid and update the person 102 with the current status of task completion. Monetization of task completion may be achieved by charging service fee to the winning party and/or the person 102 who requests the task.

In still another aspect of the present teaching, the person-centric INDEX system 202, in conjunction with the person-centric space 200, can be used for query suggestions. By processing and analyzing data from the person-centric space 200, the person-centric INDEX system 202 may build a user corpus database, which provides suggestions based on information from the private space 104 and/or semi-private space 106. In response to any input from a person 102, the person-centric INDEX system 202 may process the input and provide suggestions to the person 102 at runtime based on the person 102's relevant private and/or semi-private data from the user corpus database as well other general log-based query suggestion database and search history database. The query suggestions may be provided to the person 102 with very low latency (e.g., less than 10 ms) in response to the person 102's initial input. Further, in some embodiments, before presenting to the person 102, suggestions generated using the person 102's private and/or semi-private data from the user corpus database may be blended with suggestions produced based on general log-based query suggestion database and search history database. Such blended suggestions may be filtered and ranked based on various factors, such as type of content suggested (e.g., email, social media information, etc.), estimated intent based on an immediate previous input from the person 102, context (e.g., location, data/time, etc.) related to the person 102, and/or other factors.

Figure 3:
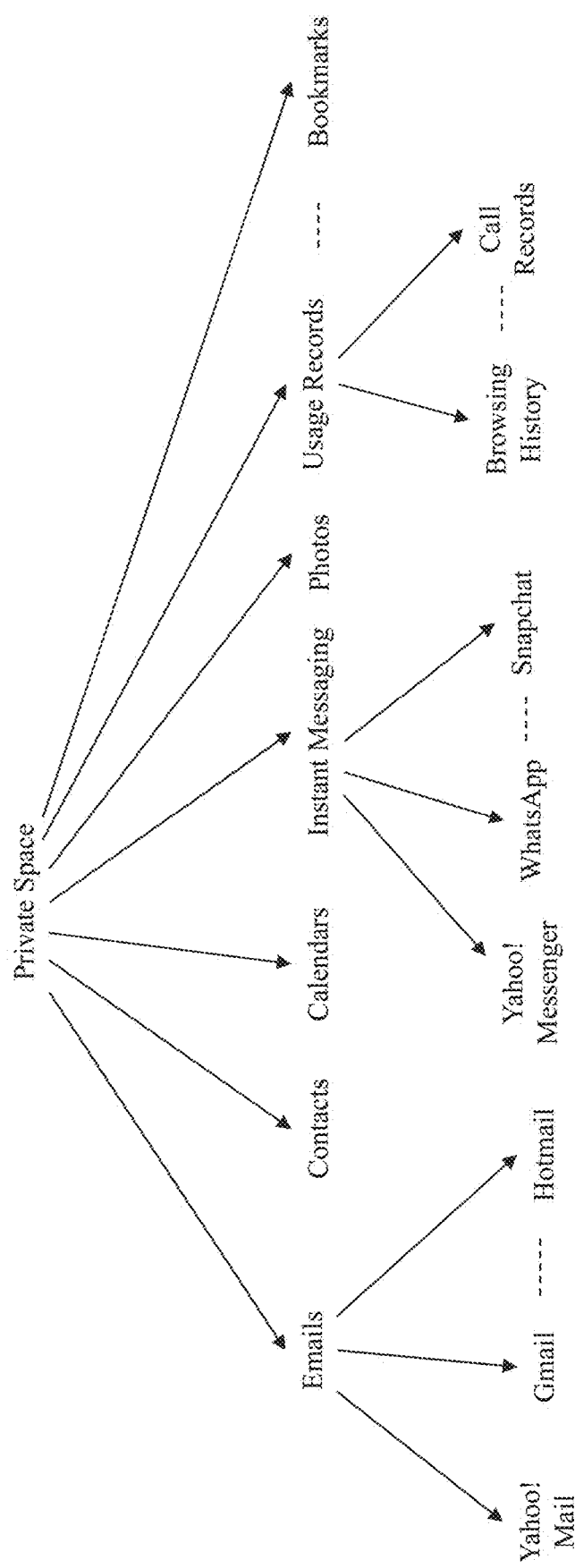
FIG. 3 illustrates exemplary types of data sources in a private space.

FIG. 3 illustrates exemplary types of data sources in a private space. The private space of a person may include any data source that is private to the person. For example, the private space may include any data source that requires access information of the person (e.g., password, token, biometric information, or any user credentials). The private space may also include any data source that is intended to be accessed only by the person even without requiring access control, such as data on a person's smart phone that does not require password or finger print verification. In this illustration, the private space includes several categories of data sources such as emails, contacts, calendars, instant messaging, photos, usage records, bookmarks, etc. Emails include emails stored in remote email servers such as Yahoo! Mail, Gmail, Hotmail, etc. and local emails in an email application on a personal computer or mobile device. Instant messaging includes any messages communicated between the person 102 and others via any instant messaging applications, for example, Yahoo! Messenger, WhatsApp, Snapchat, to name a few. Usage records may be any logs private to the person, such as, but not limited to, browsing history and call records. It is understood that the examples described above are for illustrative purpose and are not intended to be limiting.

Figure 4:
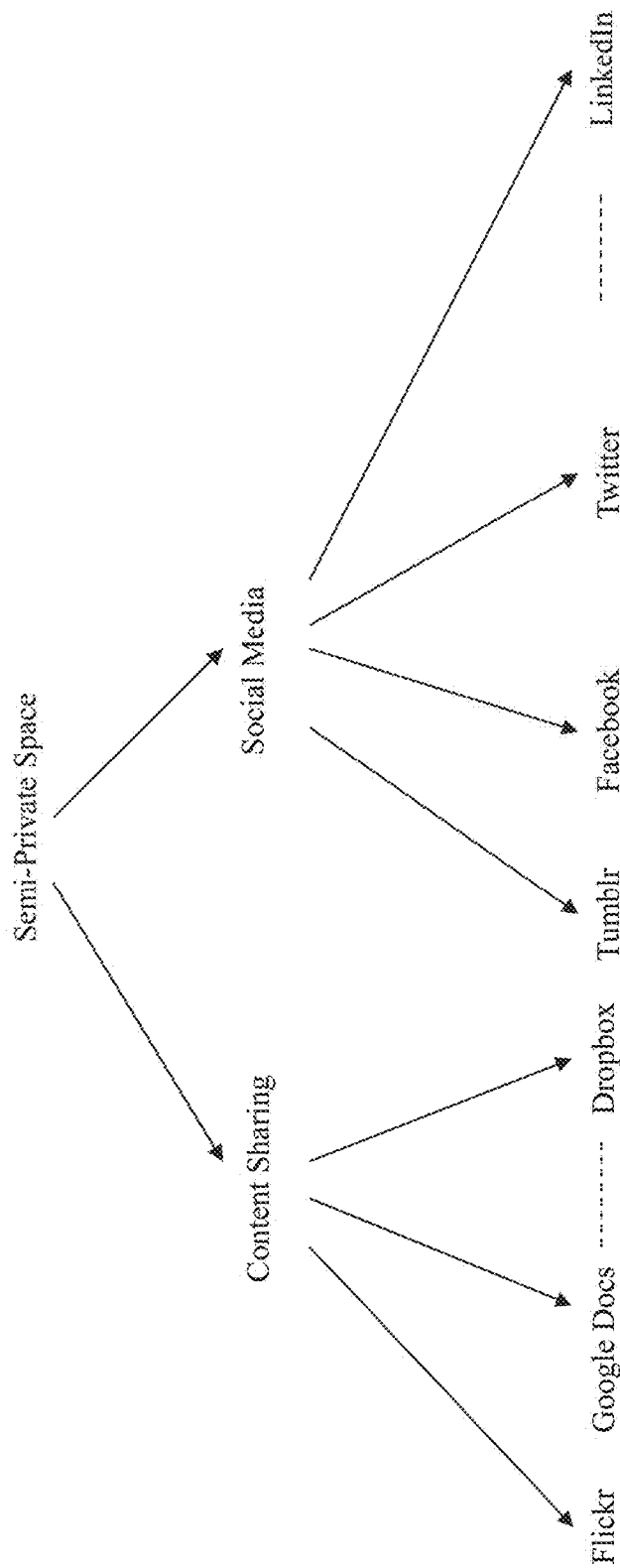
FIG. 4 illustrates exemplary types of data sources in a semi-private space.

FIG. 4 illustrates exemplary types of data sources in a semi-private space. The semi-private space of a person may include any data source that is accessible for a group of people designated by the person. One example of data sources in the semi-private space is social media, such as Tumblr, Facebook, Twitter, LinkedIn, etc. A person can designate a group of people who can access her/his information shared in the social media sites, such as status updates, posts, photos, and comments. Another example of data sources in the semi-private space is a content sharing site. For instance, a person can share photos with family and friends at Flickr, share work documents with colleagues or classmates at Google Docs, and share any files at Dropbox. It is understood that in some cases, there is not a clear boundary between a data source in the private space and a data source in the semi-private space. For instance, if a person restricts photos at Flickr to be only accessible by her/himself, then Flickr becomes a private source of the person, just like local photos stored on the person's device. Similarly, when the entire or a portion of a calendar is shared with others, the calendar becomes part of the semi-private space. It is understood that the examples described above are for illustrative purpose and are not intended to be limiting.

Figure 5:
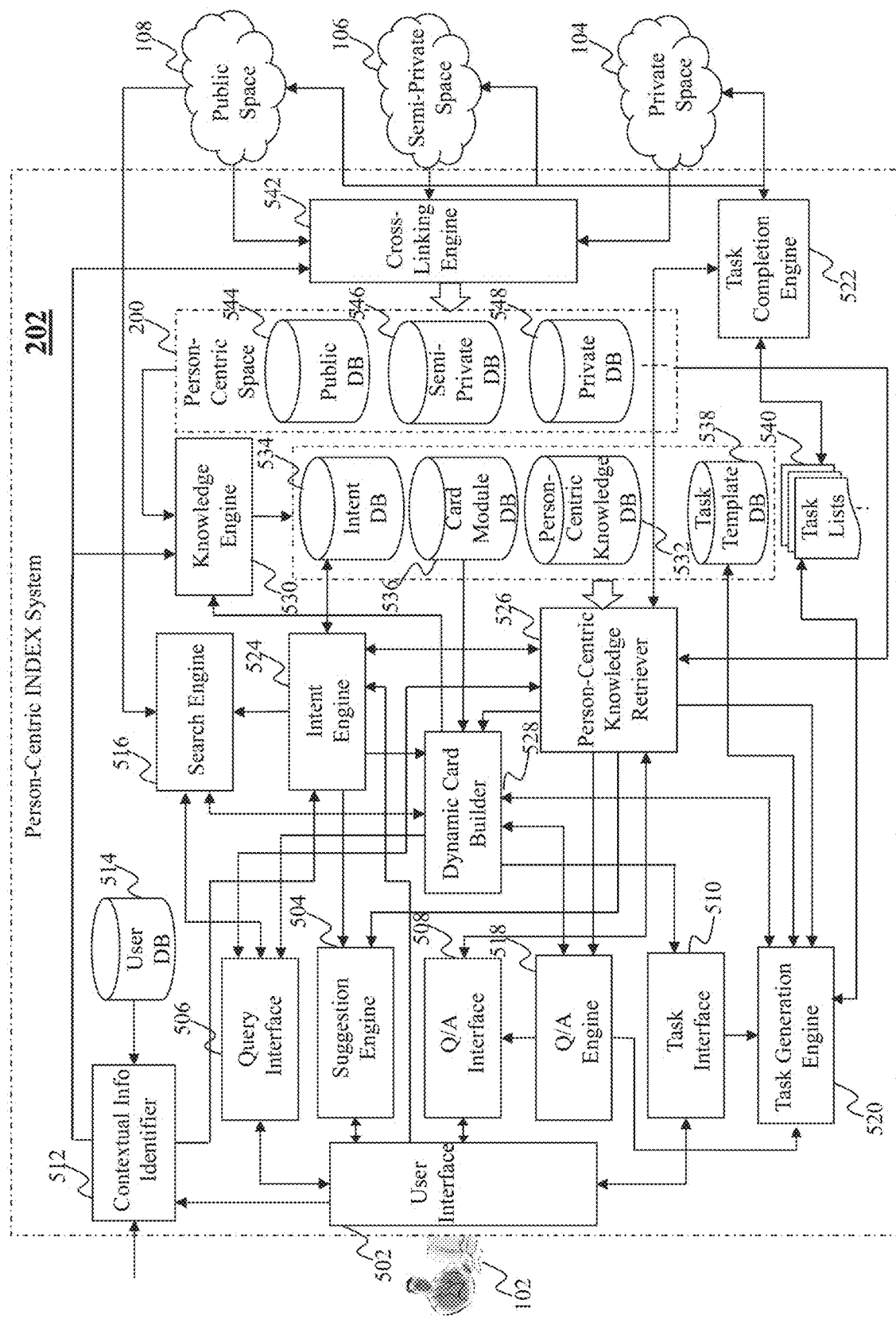
FIG. 5 depicts an exemplary system diagram of a person-centric INDEX system, according to an embodiment of the present teaching.

FIG. 5 depicts an exemplary system diagram of the person-centric INDEX system 202, according to an embodiment of the present teaching. The person-centric INDEX system 202 includes a user interface 502 that connects a person 102 with multiple front-end components including a suggestion engine 504, a query interface 506, a Q/A interface 508, a task interface 510, and a contextual information identifier 512 coupled with a user database 514. To support the front-end components, the person-centric INDEX system 202 further includes multiple functional components including a search engine 516, a Q/A engine 518, a task generation engine 520, a task completion engine 522, an intent engine 524, a person-centric knowledge retriever 526, and a dynamic card builder 528. In the back-end, the person-centric INDEX system 202 includes a variety of databases for storing information in different forms for different purposes, such as the person-centric space 200 having a public database 544, a semi-private database 546, and a private database 548. The person-centric space 200 in this embodiment is built up by a cross-linking engine 542. The person-centric INDEX system 202 further includes a knowledge engine 530 for building a person-centric knowledge database 532 by processing and analyzing information in the person-centric space 200. In addition, additional types of analytic results from the knowledge engine 530 based on data from the person-centric space 200 and/or any other suitable data sources may be stored in an intent database 534, a card module database 536, and a task template database 538.

A person 102 may interact with the person-centric INDEX system 202 via the user interface 502 by providing an input. The input may be made by, for example, typing in a query, question, or task request, or clicking or touching any user interface element in the user interface 502 to enter a query, question, or task request. With each input from the person 102, the suggestion engine 504 provides a list of suggestions to facilitate the person 102 to complete the entire input. In this embodiment, the suggestion engine 504 may provide suggestions based on the person's private and/or semi-private information retrieved by the person-centric knowledge retriever 526 from the person-centric space 200 and/or the person-centric knowledge database 532. Those suggestions include, for example, a contact name from the private contact list, part of a tweet from Twitter, or a package tracking status stored in the person-centric space 200. In some embodiments, the suggestion engine 504 may blend those suggestions based on the person 102's private and/or semi-private information with the conventional suggestions based on popular query logs and search history. In this embodiment, the intent engine 524 may provide an estimated intent associated with each input to help filtering and/or ranking the suggestions provided to the person 102.

Each of the query interface 506, Q/A interface 508, and task interface 510 is configured to receive a particular type of user inputs and forward them to the respective engine for handling. Once the results are returned from the respective engine and/or from the dynamic card builder 528, each of the query interface 506, Q/A interface 508, and task interface 510 forwards the results to the user interface 502 for presentation. In one embodiment, the user interface 502 may first determine the specific type of each input and then dispatch it to the corresponding interface. For example, the user interface 502 may identify that an input is a question based on semantic analysis or keyword matching (e.g., looking for keywords like "why" "when" "who," etc. and/or a question mark). The identified question is then dispatched to the Q/A interface 508. Similarly, the user interface 502 may determine, based on semantic analysis and/or machine learning algorithms, that an input is a task request and forward the input to the task interface 510. For any input that cannot be classified or does not fall within the categories of question and task request, the user interface 502 may forward it to the query interface 506 for general query search. It is understood that, in some embodiments, the user interface 502 may not classify an input first, but instead, forward the same input to each of the query interface 506, Q/A interface 508, and task interface 510 to have their respective engines to process the input in parallel.

Another function of the user interface 502 involves presenting information to the person 102 either as responses to the inputs, such as search results, answers, and task status, or as spontaneous notices, reminders, and updates in response to any triggering events. In this embodiment, the information to be presented to the person 102 via the user interface 502 may be presented in the form of cards that are dynamically built on-the-fly by the dynamic card builder 528 based on the intent estimated by the intent engine 524. The cards may be of different types, such as an email card summarizing one or more related emails, a search results card summarizing information relevant to one or more search results, an answer card including an answer to a question with additional information associated with the answer, or a notice card that is automatically generated to notify the person 102 of any event of interest. Based on its type, a card may be dispatched to one of the query interface 506, Q/A interface 508, and task interface 510 and eventually presented to the person 102 via the user interface 502. In addition to cards, information in any other format or presentation styles, such as search results in a research results page with "blue links" or answers in plain text, may be provided by the search engine 516 and the Q/A engine 518 directly to the query interface 506 and Q/A interface 508, respectively. It is understood that the user interface 502 may also provide information in a hybrid matter, meaning that some information may be presented as cards, while other information may be presented in its native format or style.

As the user interface 502 receives an input from the person 102, it also triggers the contextual information identifier 512 to collect any contextual information related to the person 102 and the input of the person 102. The contextual information identifier 512 in this embodiment receives user-related information from the user database 514, such as the person 102's demographic information and declared and inferred interests and preferences. Another source of contextual information is the person 102's device including, for example, date/time obtained from the timer of the person 102's device, location obtained from a global positioning system (GPS) of the person 102's device, and information related to the person 102's device itself (e.g., the device type, brand, and specification). Further, the contextual information identifier 512 may also receive contextual information from the user interface 502, such as one or more inputs immediately before the current input (i.e., user-session information). Various components in the person-centric INDEX system 202, including the cross-linking engine 542, knowledge engine 530, and intent engine 524, may take advantage of the contextual information identified by the contextual information identifier 512.

The intent engine 524 in this embodiment has two major functions: creating and updating the intent database 534 and estimating an intent based on the information stored in the intent database 534. The intent database 534 may store a personal intent space which includes all the intents that make sense to the person 102 in the form of an action plus a domain. For example, based on the person 102's search history, the intent engine 524 may identify that the person 102 has repeatedly entered different queries all related to the same intent "making restaurant reservations." This intent then may be stored as a data point in the person's personal intent space in the intent database 534 in the form of {action=making reservations; domain=restaurant}. More and more data points will be filled into the personal intent space as the person 102 continues interacting with the person-centric INDEX system 202. In some embodiments, the intent engine 524 may also update the personal intent space in the intent database 534 by adding new intents based on existing intents. For instance, the intent engine 524 may determine that hotel is a domain that is close to the restaurant domain and thus, a new intent "making hotel reservations" (in the form of {action=making reservations; domain=hotel}) likely makes sense to the person 102 as well. The new intent "making hotel reservations," which is not determined from user data directly, may be added to the personal intent space in the intent database 534 by the intent engine 524. In some embodiments, the intent database 534 include a common intent space for the general population. Some intents that are not in the personal intent space may exist in the common intent space. If they are popular among the general population or among people similar to the person 102, then the intent engine 524 may consider those intents as candidates as well in intent estimation.

In estimating intent of the person 102, the intent engine 524 receives the input from the user interface 502 or any information retrieved by the person-centric knowledge retriever 526 and tries to identify any action and/or domain from the input that is also in the intent spaces in the intent database 534. If both action and domain can be identified from the input, then an intent can be derived directly from the intent space. Otherwise, the intent engine 524 may need to take the contextual information from the contextual information identifier 512 to filter and/or rank the intent candidates identified from the intent space based on the action or domain. In one example, if the input involves only the action "making reservations" without specifying the domain, the intent engine 524 may first identify a list of possible domains that can be combined with such action according to the personal intent space, such as "hotel" and "restaurant." By further identifying that the location where the input is made is at a hotel, the intent engine 524 may estimate that the person 102 likely intends to make restaurant reservations as he is already in the hotel. It is understood that in some cases, neither action nor domain can be identified from the input or the identified action or domain does not exist in the intent space, the intent engine 524 may estimate the intent purely based on the available contextual information. Various components in the person-centric INDEX system 202, including the search engine 516, the suggestion engine 504, the dynamic card builder 528, and the person-centric knowledge retriever 526, may take advantage of the intent estimated by the intent engine 524.

The search engine 516 in this embodiment receives a search query from the query interface 506 and performs a general web search or a vertical search in the public space 108. Intent estimated by the intent engine 524 for the search query may be provided to the search engine 516 for purposes such as query disambiguation and search results filtering and ranking In some embodiments, some or all of the search results may be returned to the query interface 506 in their native format (e.g., hyperlinks) so that they can be presented to the person 102 on a conventional search results page. In this embodiment, some or all of the search results are fed into the dynamic card builder 528 for building a dynamic search results card based on the estimated intent. For instance, if the intent of the query "make reservation" is estimated as "making restaurant reservations," then the top search result of a local restaurant may be provided to the dynamic card builder 528 for building a search results card with the name, directions, menu, phone number, and reviews of the restaurant.

The Q/A engine 518 in this embodiment receives a question from the Q/A interface 508 and classifies the question into either a personal or non-personal question. The classification may be done based on a model such as a machine learning algorithm. In this embodiment, the Q/A engine 518 may check the person-centric knowledge database 532 and/or the private database 548 and semi-private database 546 in the person-centric space 200 via the person-centric knowledge retriever 526 to see if the question is related to any private, semi-private data, or personal knowledge of the person 102. For instance, the question "who is Taylor Swift" is normally classified as a non-personal question. But in the case if "Taylor Swift" is in the person 102's contact list or social media friend list, or if "Taylor Swift" has sent emails to the person 102, the Q/A engine 518 then may classify the question as a personal question. For non-personal questions, any known approaches may be used to obtain the answers.

Once the question is classified as personal, various features including entities and relationships are extracted by the Q/A engine 518 from the question using, for example, a machine learned sequence tagger. The extracted entities and relationships are used to traverse, by the person-centric knowledge retriever 526, the person-centric knowledge database 532, which stores person-centric relationships stored in a pre-defined form. In some embodiments, the person-centric relationships may be stored in a triple format including one or more entities and a relationship therebetween. When the Q/A engine 518 finds an exact match of relationship and entity, it returns an answer. When there is no exact match, the Q/A engine 518 takes into consideration a similarity between the question and answer triples and uses the similarity to find the candidate answers. To measure the similarity, words embedded over a large corpus of user texts may be collected and trained by the Q/A engine 518. The well-organized, person-centric information stored in the person-centric space 200 and the person-centric knowledge database 532 makes it possible for the Q/A engine 518 to answer a personal question in a synthetic manner without the need of fully understanding the question itself. The answers generated by the Q/A engine 518 may be provided to the dynamic card builder 528 for building answer cards.

The task generation engine 520 and the task completion engine 522 work together in this embodiment to achieve automatic task generation and completion functions of the person-centric INDEX system 202. The task generation engine 520 may automatically generate a task in response to a variety of triggers, including for example, a task request from the person 120 received via the task interface 510, an answer generated by the Q/A engine 518, a card constructed by the dynamic card builder 528, or an event or behavior pattern related to the person 102 from the person-centric space 200 and/or the person-centric knowledge database 532. Intent may have also been taken into account in some embodiments in task generation. The task generation engine 520 in this embodiment also divides each task into a series of task actions, each of which can be scheduled for execution by the task completion engine 522. The task template database 538 stores templates of tasks in response to different triggers. The task generation engine 520 may also access the task template database 538 to retrieve relevant templates in task generation and update the templates as needed. In some embodiments, the task generation engine 520 may call the dynamic card builder 528 to build a card related to one or more tasks so that the person 102 can check and modify the automatically generated task as desired.

The tasks and task actions are stored into task lists 540 by the task generation engine 520. Each task may be associated with parameters, such as conditions in which the task is to be executed and completed. Each individual task action of a task may also be associated with execution and completion conditions. The task completion engine 522 fetches each task from the task lists 540 and executes it according to the parameter associated therewith. For a task, the task completion engine 522 dispatches each of its task actions to an appropriate executor to execute it, either internally through the person-centric knowledge retriever 526 or externally in the public space 108, semi-private space 106, or private space 104. In one example, task actions such as "finding available time on Tuesday for lunch with mom" can be completed by retrieving calendar information from the private database 548 in the person-centric space 200. In another example, task actions like "ordering flowers from Aunt Mary's flower shop" can only be completed by reaching out to the flower shop in the public space 108. The task completion engine 522 may also schedule the execution of each task action by putting it into a queue. Once certain conditions associated with a task action are met, the assigned executor will start to execute it and report the status. The task completion engine 522 may update the task lists 540 based on the status of each task or task action, for example, by removing completed tasks from the task lists 540. The task completion engine 522 may also provide the status updates to the person-centric knowledge retriever 526 such that the status updates of any ongoing task become available for any component in the person-centric INDEX system 202 as needed. For instance, the dynamic card builder 528 may build a notice card notifying the person that your task request "sending flowers to mom on Mother's day" has been completed.

As a component that supports intent-based dynamic card construction for various front-end components, the dynamic card builder 528 receives requests from the search engine 516, the Q/A engine 518, the task generation engine 520, or the person-centric knowledge retriever 526. In response, the dynamic card builder 528 asks for the estimated intent associated with the request from the intent engine 524. Based on the request and the estimated intent, the dynamic card builder 528 can create a card on-the-fly by selecting suitable card layout and/or modules from the card module database 536. The selection of modules and layouts is not predetermined, but may depend on the request, the intent, the context, and information from the person-centric space 200 and the person-centric knowledge database 532. Even for the same query repeatedly received from the same person 102, completely different cards may be built by the dynamic card builder 528 based on the different estimated intents in different contexts. A card may be created by populating information, such as search results, answers, status updates, or any person-centric information, into the dynamically selected and organized modules. The filling of information into the modules on a card may be done in a centralized manner by the dynamic card builder 528 regardless of the type of the card or may be done at each component where the request is sent. For example, the Q/A engine 518 may receive an answer card construction with dynamically selected and organized modules on it and fill in direct and indirect answers into those modules by itself.

In one embodiment, the person-centric knowledge retriever 526 can search the person-centric space 200 and the person-centric knowledge database 532 for relevant information in response to a search request from the intent engine 524, the query interface, the Q/A engine 518, the suggestion engine 504, the dynamic card builder 528, or the task generation engine 520. The person-centric knowledge retriever 526 may identify one or more entities from the search request and search for the matched entities in the person-centric knowledge database 532. As entities stored in the person-centric knowledge database 532 are connected by relationships, additional entities and relationships associated with the matched entities can be returned as part of the retrieved information as well. As for searching in the person-centric space 200, in one embodiment, the person-centric knowledge retriever 526 may first look for private data in the private database 548 matching the entities in the search request. As data in the person-centric space 200 are cross-linked by cross-linking keys, the entities and/or the cross-linking keys associated with the relevant private data may be used for retrieving additional information from the semi-private database 546 and the public database 544. For instance, to handle a search request related to "amazon package," the person-centric knowledge retriever 526 may first look for information in the private database 548 that is relevant to "amazon package." If an order confirmation email is found in the private database 548, the person-centric knowledge retriever 526 may further identify that the order confirmation email is associated with a cross-linking key "tracking number" in the package shipping domain. Based on the tracking number, the person-centric knowledge retriever 526 then can search for any information that is also associated with the same tracking number in the person-centric space 200, such as the package status information from www.FedEx.com in the public database 544. As a result, the person-centric knowledge retriever 526 may return both the order confirmation email and the package status information as a response to the search request.

In some embodiments, the person-centric knowledge retriever 526 may retrieve relevant information from multiple data sources in parallel and then blend and rank all the retrieved information as a response to the search request. It is understood that information retrieved from each source may be associated with features that are unique for the specific source, such as the feature "the number of recipients that are cc'd" in the email source. In order to be able to blend and rank results from different sources, the person-centric knowledge retriever 526 may normalize the features of each result and map them into the same scale for comparison.

The cross-linking engine 542 in this embodiment associates information relevant to the person 102 from the private space 104, the semi-private space 106, and the public space 108 by cross-linking data based on cross-linking keys. The cross-linking engine 542 may first process all information in the private space 104 and identify cross-linking keys from the private space 104. For each piece of content in the private space 104, the cross-linking engine 542 may identify entities and determine the domain to which the content belongs. Based on the domain, one or more entities may be selected as cross-linking keys for this piece of content. In one example, tracking number may be a cross-linking key in the package shipping domain. In another example, flight number, departure city, and departure date may be cross-linking keys in the flight domain. Once one or more cross-linking keys are identified for each piece of information in the private space 104, the cross-linking engine 542 then goes to the semi-private space 106 and the public space 108 to fetch information related to the cross-linking keys. For example, the tracking number may be used to retrieve package status information from www.FedEx.com in the public space 108, and the flight number, departure city, and departure date may be used to retrieve flight status from www.UA.com in the public space 108. Information retrieved by the cross-linking engine 542 from the private space 104, semi-private space 106, and public space 108 may be stored in the private database 548, semi-private database 546, and public database 544 in the person-centric space 200, respectively. As each piece of information in the person-centric space 200 is associated with one or more cross-linking keys, they are cross-linked with other information associated with the same cross-linking keys, regardless which space it comes from. Moreover, as the cross-linking keys are identified based on the person's private data (e.g., emails), all the cross-linked information in the person-centric space 200 are relevant to the person 102.

Although only one database is shown in FIG. 5 for information from the private space 104, the semi-private space 106, or the public space 108, it is understood that information within a particular space may be organized and stored in different databases in the person-centric space 200. For instance, private data from emails, contacts, calendars, and photos may be stored in separate databases within the private database 548; semi-private data from Facebook, Twitter, LinkedIn, etc. may be stored in separate databases within the semi-private database 546 as well. Such arrangement may enable applying different feature extraction models to different data sources, which may be helpful for the suggestion engine 504 and the person-centric knowledge retriever 526. As mentioned above, the cross-linking engine 542 continuously and dynamically maintains and updates the person-centric space 200 on a regular basis and/or in response to any triggering event. For example, any internal operation, such as query search, question answering, or task completion, may trigger the cross-linking engine 542 to update the affected data or add missing data in the person-centric space 200.

The knowledge engine 530 in this embodiment processes and analyzes the information in the person-centric space 200 to derive analytic results in order to better understand the person-centric space 200. In one embodiment, the knowledge engine 530 extracts entities from content in the person-centric space 200 and resolves them to what they refer to (i.e., can disambiguate an extracted entity when it may refer to multiple individuals). In addition to determining an entity type for an extracted entity name, the knowledge engine 530 may also determine a specific individual referred to by this entity name. The knowledge engine 530 can make use of contextual information and/or textual metadata associated with the entity name in the email to disambiguate such cases, providing a high precision resolution.

The knowledge engine 530 also builds a person-centric knowledge representation for a person 102 by extracting and associating data about the person 102 from personal data sources. The person-centric knowledge representation for the person 102 is stored in the person-centric knowledge database 532. The knowledge engine 530 can extract entities related to the person 102 and infer relationships between the entities without the person 102's explicit declaration, and create, for example, a person-centric knowledge graph for the person 102 based on the entities and relationships. The knowledge elements that can be inferred or deduced may include, for example, the person 102's social contacts, and the person 102's relationships with places, events, or other users.

Figure 6:
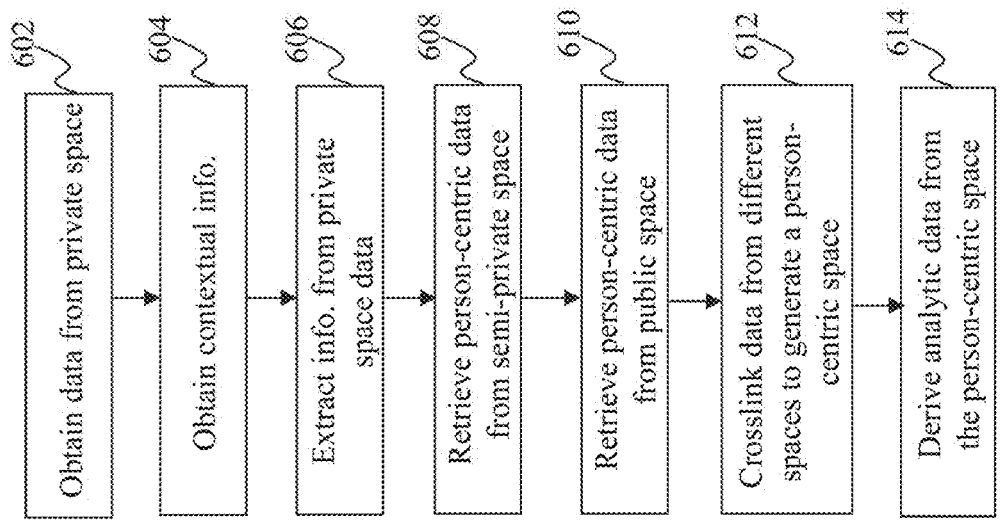
FIG. 6 is a flowchart of an exemplary process for building a person-centric space, according to an embodiment of the present teaching.

FIG. 6 is a flowchart of an exemplary process for building a person-centric space, according to an embodiment of the present teaching. Starting at 602, data from the private space 104 is obtained. The data includes any content that is private to a person, such as emails, contacts, calendar events, photos, bookmarks, instant messages, usage records, and so on. Contextual information is obtained at 604. The contextual information includes, but is not limited to, user information such as demographic information and interests and preferences, locale information, temporal information, device information, and user-session information (e.g., other user inputs in the same or adjacent user-sessions). At 606, information from the private space data is extracted. The information may be cross-linking keys determined from entities extracted from the private space data based on the domain of the private space data and/or the obtained contextual information. Person-centric data is then retrieved from the semi-private space at 608. Similarly, person-centric data is retrieved from the public space at 610. In this embodiment, the person-centric data is retrieved based on the cross-linking keys. At 612, all pieces of person-centric data retrieved from the private space, semi-private space, and public space are cross-linked together to generate a person-centric space. In this embodiment, the cross-linking is done based on the same cross-linking keys associated with these pieces of person-centric data. At 614, analytic data is derived from the person-centric space. For example, entities may be extracted from the person-centric space and are disambiguated by the knowledge engine 530 to ascertain their extract meanings Relationships between the entities may be inferred based on information from the person-centric space by the knowledge engine 530 as well. Based on the entities and relationships, person-centric knowledge can be derived and stored in the person-centric knowledge database 532.

Figure 7:
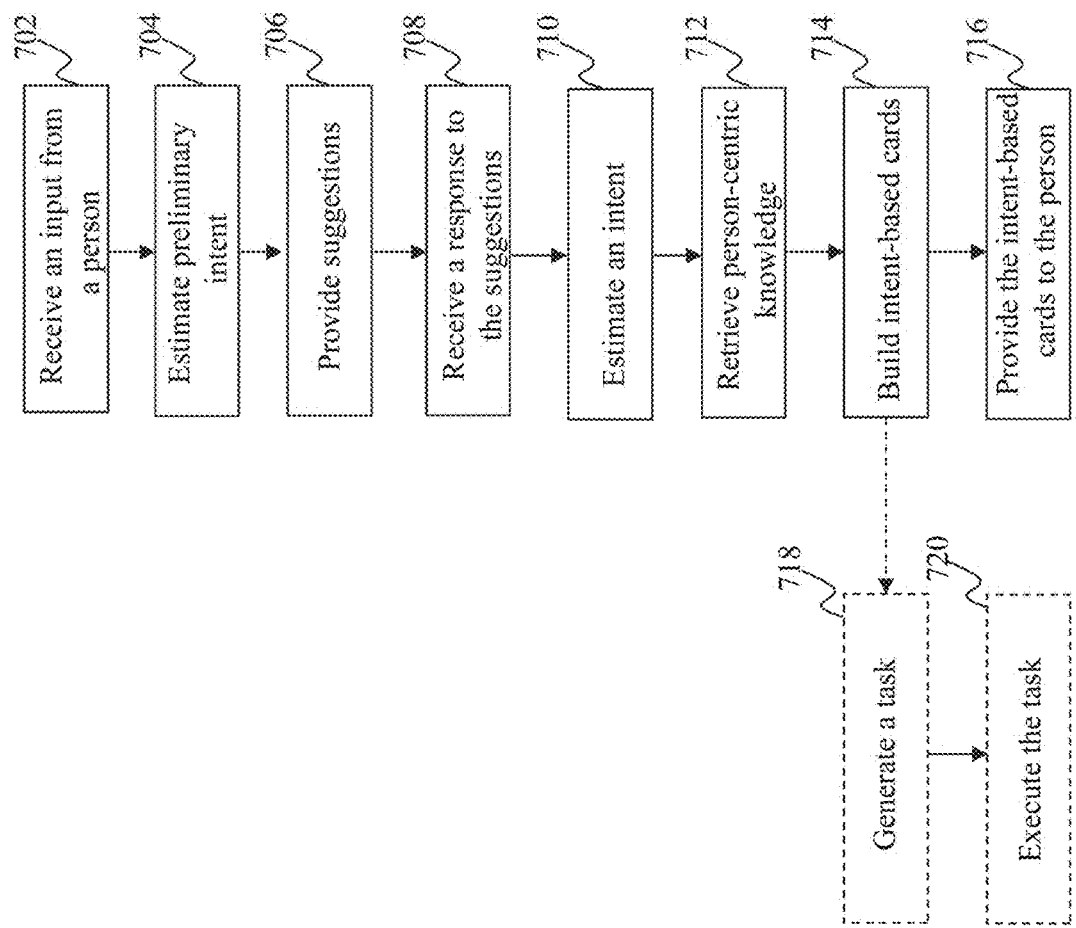
FIG. 7 is a flowchart of an exemplary process for applying a person-centric space for digital personal assistance, according to an embodiment of the present teaching.

FIG. 7 is a flowchart of an exemplary process for applying a person-centric space for digital personal assistance, according to an embodiment of the present teaching. Starting at 702, an input from a person is received. As the person enters the input, a preliminary intent is estimated and continuously updated at 704. The estimation may be based on the current input and any contextual information currently available. At 706, one or more suggestions are generated based on the current input and the estimated intent and provided to the person to assist completing the current input. A response to the suggestions is received from the person at 708. The response may be a selection of one suggestion or ignoring the suggestions and finishing the input as the person desires. Once the completed input is received, either as a selection of a suggestion or a fully-entered input, at 710, the intent is estimated again for the completed input. The intent may be estimated based on the completed input and the currently available contextual information. In some embodiments, if no input is received (e.g., when the person just logs into and has not entered anything yet), the intent may be estimated based on the contextual information alone. At 712, person-centric knowledge is retrieved based on the input. In some embodiments, the estimated intent may be used for retrieving the person-centric knowledge as well. As described above in detail, the input may be a question, a task request, or a query. In any event, entities and/or relationships may be derived from the input and are used for retrieving relevant person-centric knowledge from the person-centric knowledge database 532. In some embodiments, additional information may be retrieved from the person-centric space. Intent-based cards are built at 714. Each card may be constructed based on a layout and one or more modules that are selected based on the type of the card and the estimated intent. Content in each module may be filled in based on the person-centric knowledge and any additional information retrieved at 712. Optionally or additionally, at 718, the construction of a card may cause a task to be generated based on the estimated intent. For instance, an email card summarizing an online order confirmation email may trigger the generation of a task for automatically tracking the package status. At 720, the task is executed. Nevertheless, at 716, the intent-based cards, either an email card, an answer card, a search results card, or a notice card, are provided to the person as a response to the input.

Figure 8:
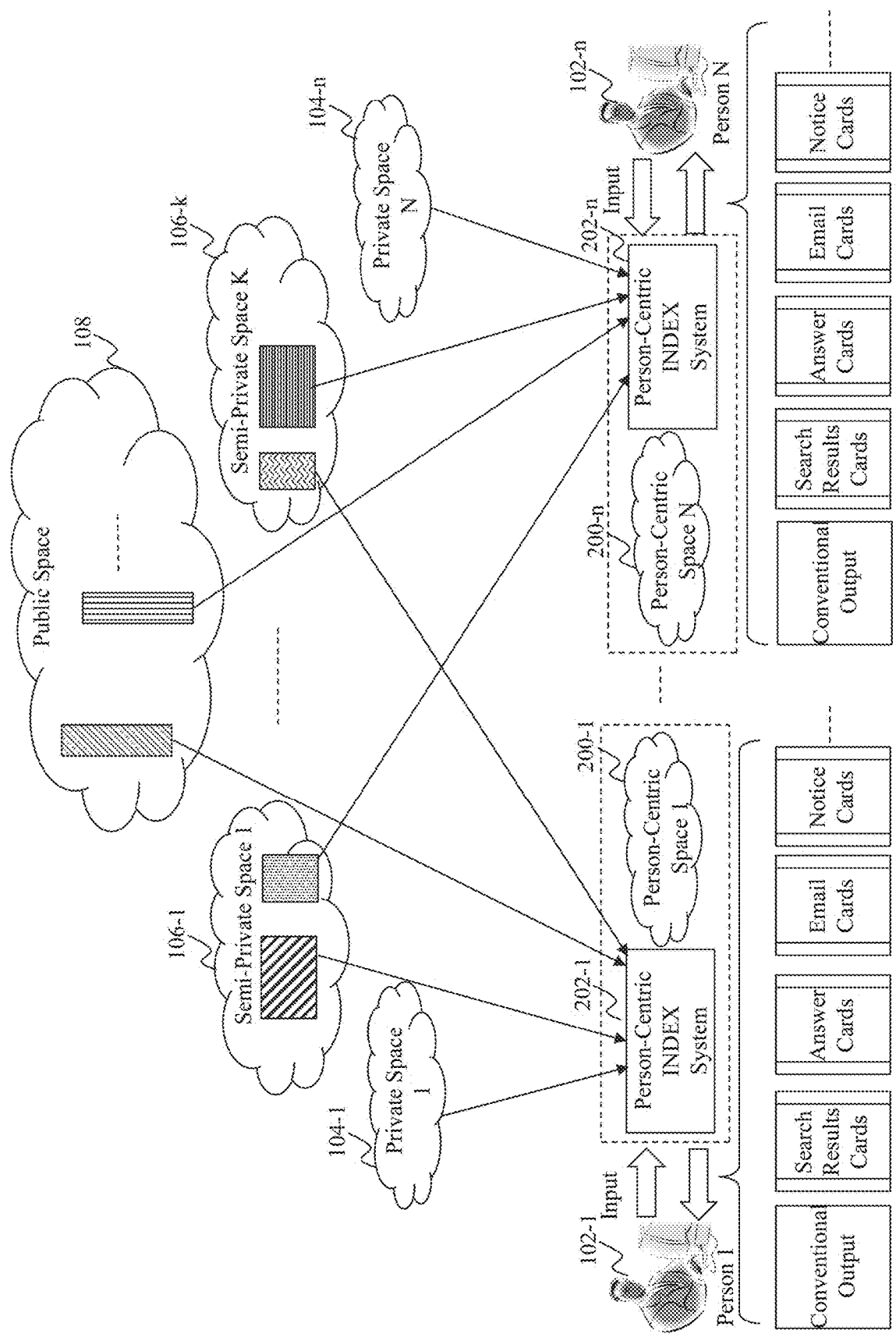
FIG. 8 depicts an exemplary scheme of building a person-centric space for each individual person via a person-centric INDEX system and applications thereof, according to an embodiment of the present teaching.

FIG. 8 depicts an exemplary scheme of building a person-centric space for each individual person via the person-centric INDEX system and applications thereof, according to an embodiment of the present teaching. In this embodiment, each person 102-1, . . . 102-$n$ may access its own person-centric INDEX system 202-1, . . . 202-$n$, respectively. The person-centric INDEX system 202 may be a stand-alone system installed on each person 102-1, . . . 102-$n$'s device, a cloud-based system shared by different persons 102-1, . . . 102-$n$, or a hybrid system in which some components are installed on each person 102-1, . . . 102-$n$'s device and some components are in the cloud and shared by different persons 102-1, . . . 102-$n$.

In this embodiment, individual person-centric spaces 200-1, . . . 200-$n$ are generated for each person 102-1, . . . 102-$n$ via its own person-centric INDEX system 202-1, . . . 202-$n$, respectively For example, person-centric space 1 200-1 includes the projections from different spaces related to person 1 102-1 from the perspectives of person 1 102-1 (e.g., the entire private space 1 104-1, parts of the semi-private spaces 1-$k$ 106-1, . . . 106-$k$ that are relevant to person 1 102-1, and a slice of the public space 108 that is relevant to person 1 102-1). Each person 102-1, . . . 102-$n$ then uses its own person-centric INDEX system 202-1, . . . 202-$n$ to access its own person-centric space 200-1, . . . 200-$n$, respectively. Based on inputs from a person to its person-centric INDEX system, outputs are returned based on information from the person-centric space in any forms and styles, including, for example, any conventional outputs such as search result pages with "blue links," and any types of intent-based cards such as search results cards, answer cards, email cards, notice cards, and so on.

Figure 9:
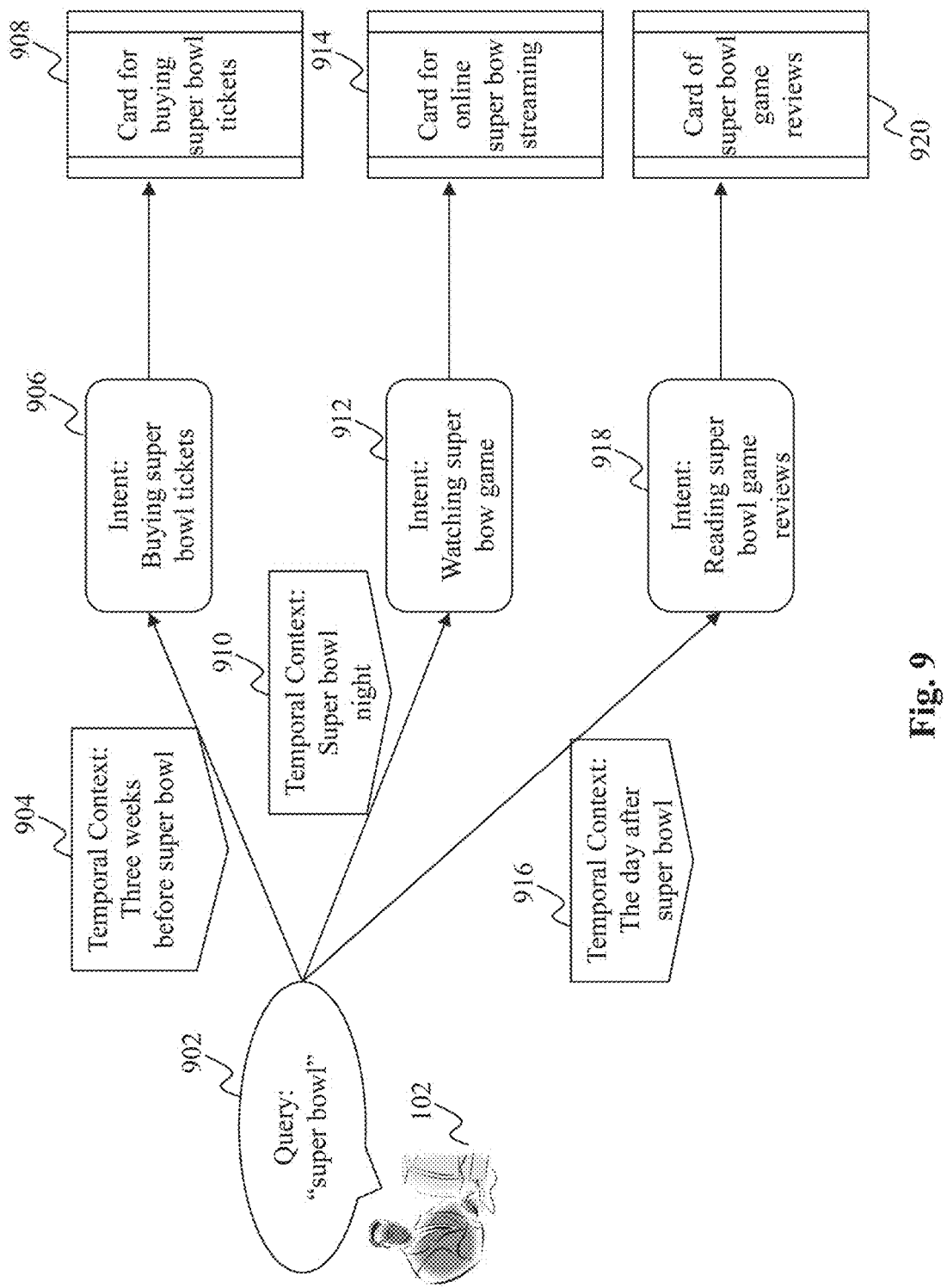
FIG. 9 depicts an exemplary scheme in which a variety of dynamic cards are built and provided to a person based on different intents estimated for the same query in different contexts, according to an embodiment of the present teaching.

FIG. 9 depicts an exemplary scheme in which a variety of dynamic cards are built and provided to a person based on different intents estimated for the same query in different contexts, according to an embodiment of the present teaching. Conventionally, a static card that has been pre-constructed for certain popular entities may be presented to a person when the query from the person happens to include one of those popular entities. In contrast, intent-based cards according to the present teaching can be dynamically generated on-the-fly by the person-centric INDEX system 202 responsive to a query 902 from the person 102. In this example, the person 102 inputs the same query 902 "super bowl" at different times. When the query 902 is entered three weeks before the super bowl game, its temporal context 904 will likely cause the intent 906 to be estimated as "buying super bowl tickets." Based on such intent, a card 908 is dynamically generated for buying super bowl tickets, including information such as super bowl ticket prices, tips on how to purchase, purchase website, etc. In some embodiments, the generation of this card 908 would cause a task of purchasing super bowl tickets to be automatically generated and completed. As time passes, when the temporal context 910 changes to the super bowl night, when the person 102 enters the same query 902, the intent 912 will likely change to "watching super bowl game." Accordingly, a different card 914 for online super bowl game streaming is built and presented to the person 102, which may include, for example, websites currently streaming the game. When the game finishes and the temporal context 916 changes to the day after the super bowl game, if the person 102 again enters the query 902, the intent 918 will likely become "reading super bowl game reviews." A card 920 of super bowl game reviews is constructed and presented to the person 102. It is understood that the examples described above are for illustrative purpose and are not intended to be limiting.

Figure 10:
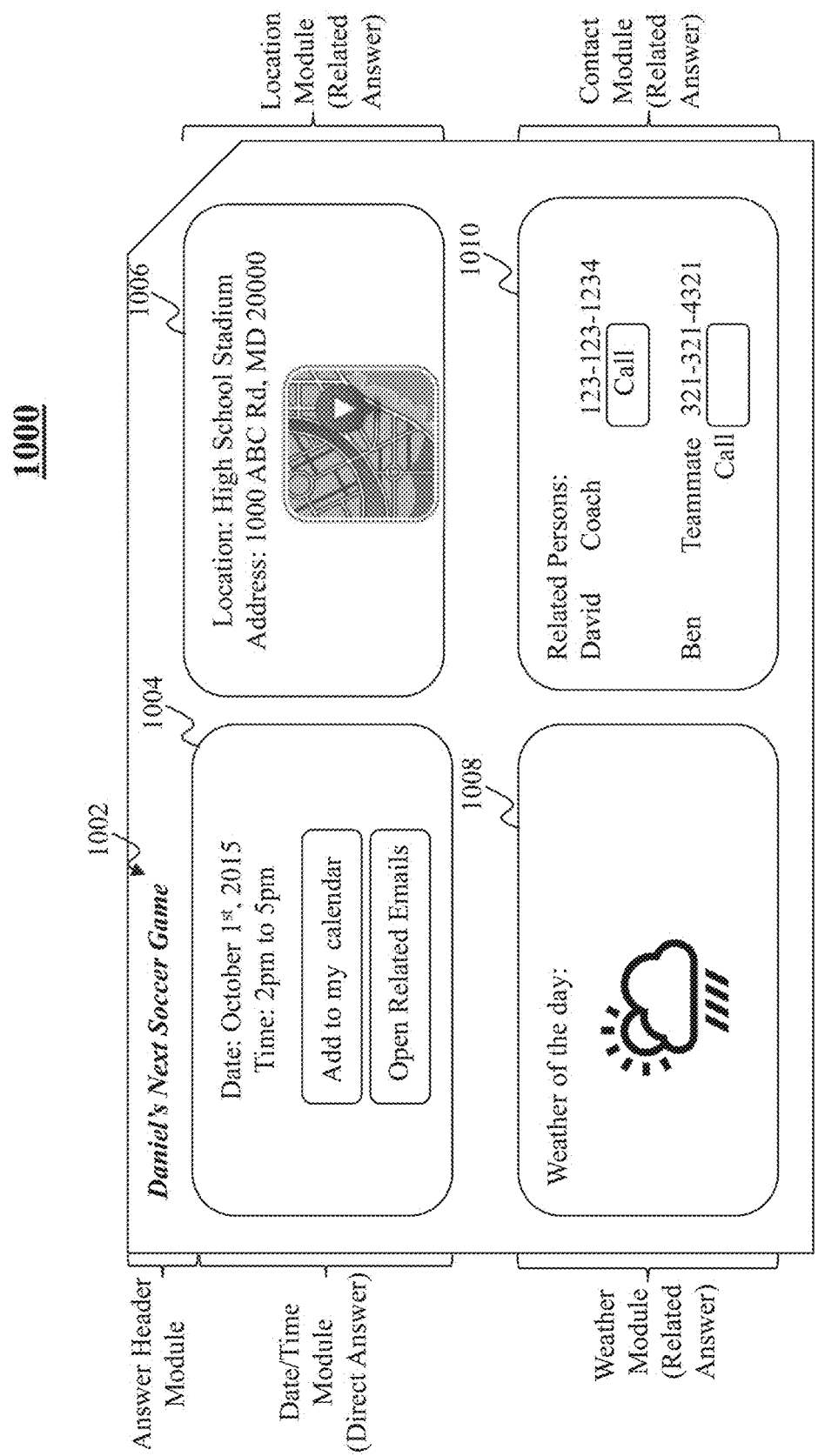
FIG. 10 illustrates an exemplary answer card, according to an embodiment of the present teaching.

FIG. 10 illustrates an exemplary answer card, according to an embodiment of the present teaching. The answer card 1000 in this example is dynamically constructed on-the-fly in response to the question "when is my son's soccer game?" Based on the type of the card (answer card) and intent (finding out my son's soccer game date/time), the layout and modules are determined as shown in FIG. 10. It is understood that the shape, size, and layout of the answer card 1000 is for illustrative purpose only and may vary in other examples. In some embodiments, the shape, size, and layout may be dynamically adjusted to fit the specification of the user device (e.g., screen size, display resolution, etc.).

In this example, the answer card includes an answer header module 1002 indicating that the topic of the answer card 1000 is "Daniel's (my son's name identified according to person-centric knowledge) Next Soccer Game." The direct answer to the question is found from a private email and provided in the date/time module 1004. Optionally, certain actions related to the answer may be provided as well, such as "add to my calendar" and "open related emails." Other information related to the direct answer is provided in other modules as well. The location module 1006 provides the location, address, and map of the soccer game. Information such as location and address may be retrieved from the email related to the game in the private database 548 of the person-centric space 200, while the map may be retrieved from Google Maps in the public space 108. The weather module 1008 provides the weather forecast of the game day, which may be retrieved from wwww.Weather.com in the public space 108. The contact module 1010 shows persons involved in the game and their contact information retrieved from the email about the game and private contact lists in the private database 548 of the person-centric space 200. Optionally, action buttons may be provided to call the persons directly from the answer card 1000. It is understood that the example described above is for illustrative purpose and are not intended to be limiting.

Figure 11:
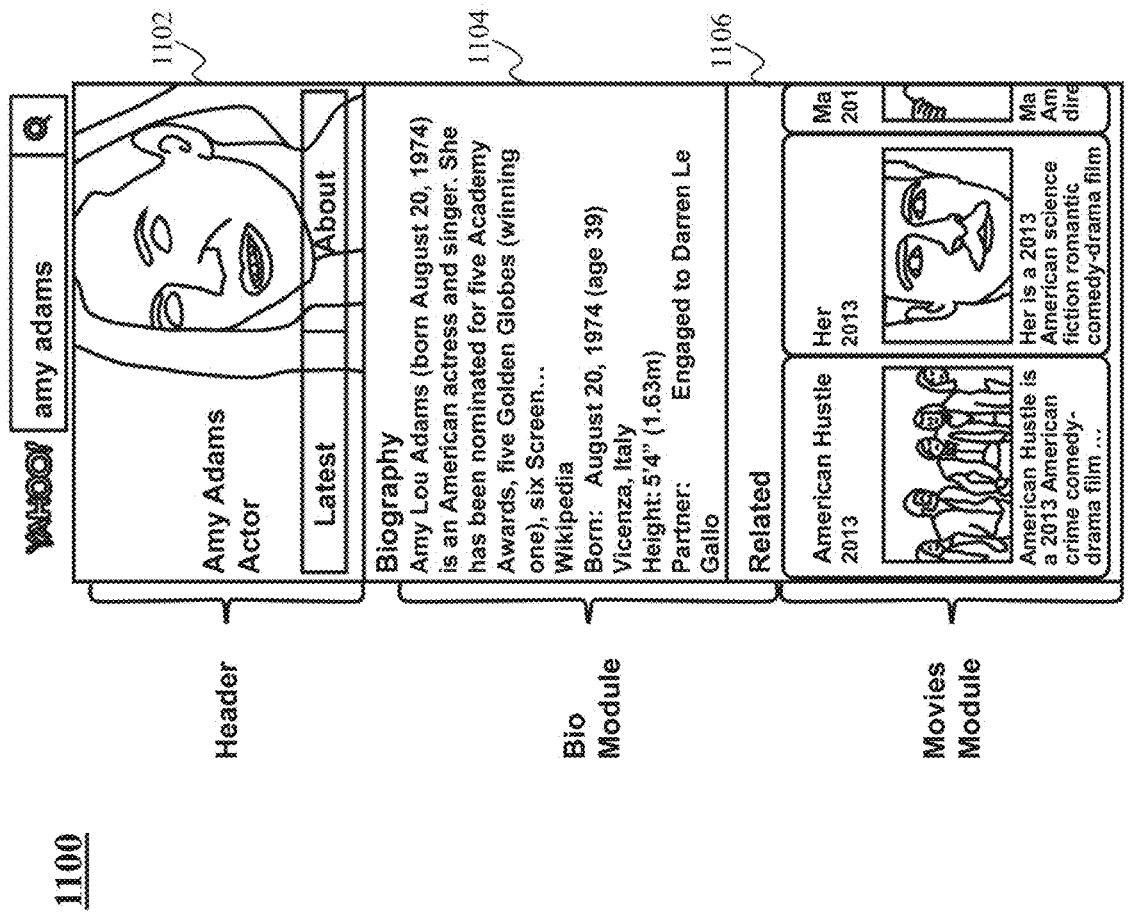
FIG. 11 illustrates an exemplary search results card, according to an embodiment of the present teaching.

FIG. 11 illustrates an exemplary search result card, according to an embodiment of the present teaching. The search results card 1100 in this example is dynamically constructed on-the-fly in response to the query "amy adams." Based on the type of the card (a search results card) and intent (learning more about actor Amy Adams), the layout and modules are determined as shown in FIG. 11. It is understood that the shape, size, and layout of the search results card 1100 is for illustrative purpose only and may vary in other examples. In some embodiments, the shape, size, and layout may be dynamically adjusted to fit the specification of the user device (e.g., screen size, display resolution, etc.). In this example, the search results card 1100 includes a header module 1102 with the name, occupation, and portrait of Amy Adams. The bio module 1104 includes her bio retrieved from Wikipedia, and the movies module 1106 includes her recent movies. In the movies module 1106, each movie may be presented in a "mini card" with the movie's name, release year, poster, and brief instruction, which are retrieved from www.IMDB.com. The movies module 1106 is actionable so that a person can swap the "mini cards" to see information of more her movies. If more modules cannot be shown simultaneously due to the size of the search results card 1100 (for example when it is shown on a smart phone screen), tabs (e.g., "Latest," "About") may be used to display different modules. It is understood that the example described above is for illustrative purpose and are not intended to be limiting.

Figure 12:
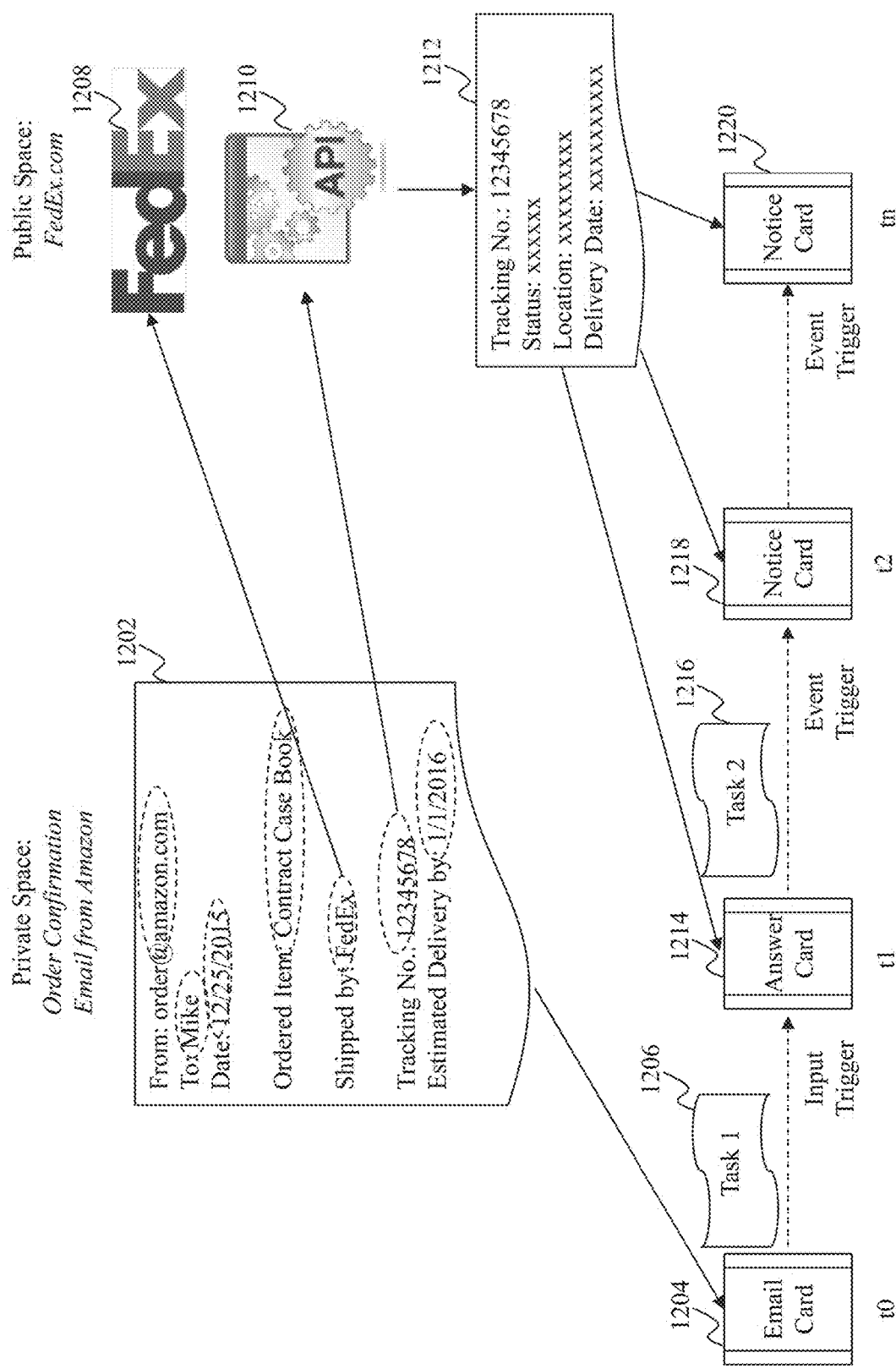
FIG. 12 depicts an exemplary scheme of automatic online order email summary and package tracking via cross-linked data in a person-centric space, according to an embodiment of the present teaching.

FIG. 12 depicts an exemplary scheme of automatic online order email summary and package tracking via cross-linked data in a person-centric space, according to an embodiment of the present teaching. Various aspects of the present teaching are illustrated in FIG. 12 as well as related FIGS. 13-15, including cross-linking data from different spaces, entity extraction and building person-centric knowledge representation, dynamic card productions based on intent, answering personal questions, and automatic task generation and completion. In this example, at time t0, an order confirmation email 1202 is received from www.Amazon.com. The email 1202 in the private space is processed to extract and identify entities. The entities include, for example, seller/vendor—www.Amazon.com, recipient/person—Mike, order date—12/25/2015, item—Contract Case book, shipping carrier—FedEx, tracking number—12345678, and estimated delivery date: 1/1/2016. In response to receiving the email 1202, an email card 1204 summarizing the email 1202 is generated and may be provided to Mike automatically or upon his request.

Figure 13:
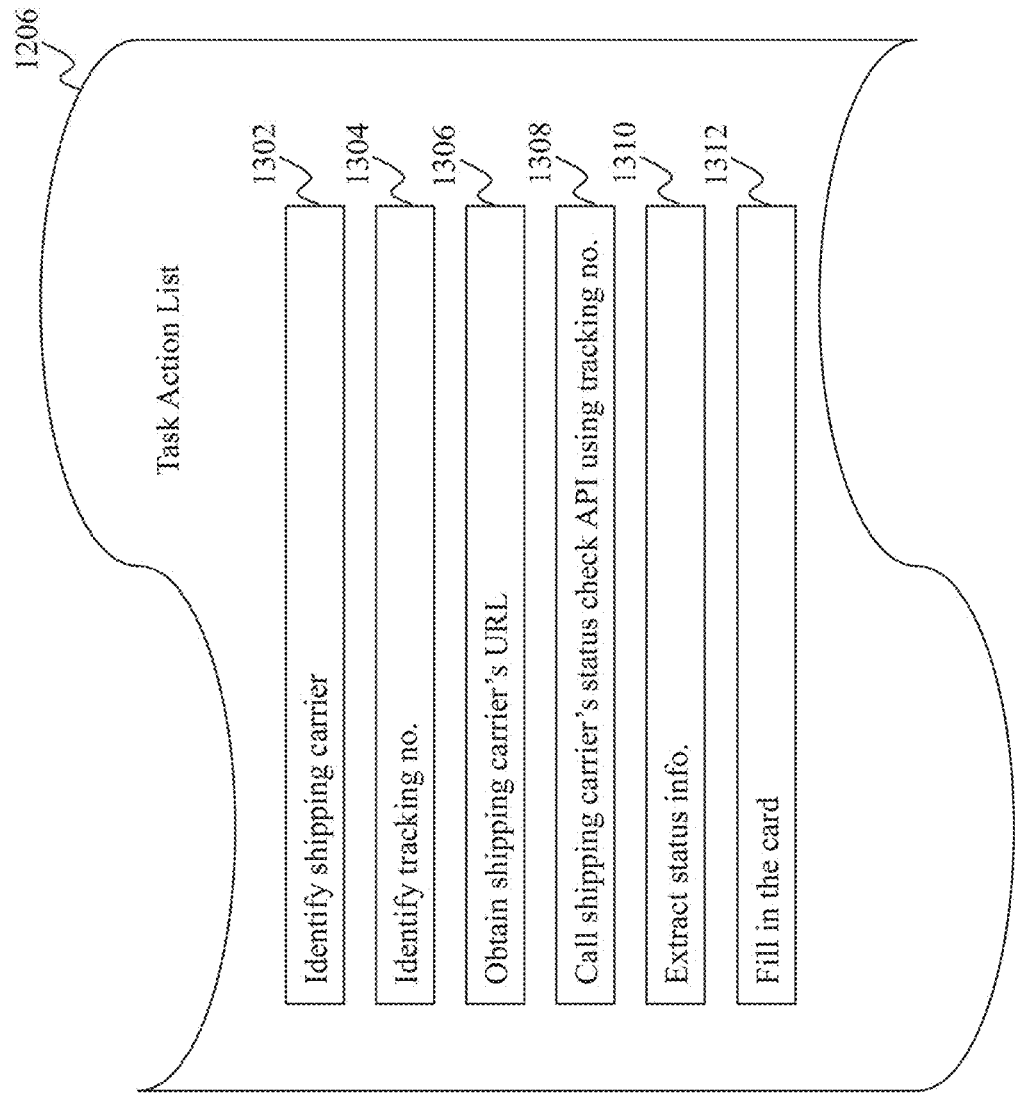
FIG. 13 illustrates an exemplary task with a list of task actions for automatic package tracking.

The generation of the email card 1204 in this example automatically initiates the generation of task 1 1206 for checking package status. The details of task 1 1206 will be described in FIG. 13. In order to check the package status, one or more cross-linking keys in the package shipping domain are identified among the entities extracted from the email 1202. As shown in FIG. 13, the entity "shipping carrier—FedEx" is a cross-linking key used for identifying the website of FedEx 1208 in the public space, and the entity "tracking number—12345678" is a cross-linking key used for calling the status check API 1210 of FedEx 1208. Based on the tracking number, package status information 1212 is retrieved from FedEx 1208. Different pieces of information from the private space and public space are thus cross-linked based on the cross-linking keys and can be projected into the person-centric space.

At time t1, in response to an input from Mike (e.g., a question "where is my amazon order?"), an answer card 1214 is dynamically generated based on private information in the email card 1204 and the public package status information 1212. The answer card 1214 is presented to Mike as an answer to his question. In this example, the generation of the answer card 1214 automatically initiates another task 2 1216 for monitoring and reporting package status update. According to task 2 1216, package status information 1212 may be regularly refreshed and updated according to a schedule (e.g., every two hours) or may be dynamically refreshed and updated upon detecting any event that affects the package delivery. In this example, at times t2 and tn, certain events, such as package being delayed due to severe weather or package being delivered, trigger the generation of notice cards 1218, 1220, respectively. It is understood that the example described above is for illustrative purpose and are not intended to be limiting.

FIG. 13 illustrates an exemplary task with a list of task actions for automatic package tracking Task 1 1206 for tracking package status in this example includes a series of task actions (task action list): identifying shipping carrier 1302, identifying tracking number 1304, obtaining shipping carrier's URL 1306, calling shopping carrier's status check API using the tracking number 1308, extracting status information 1310, and filling in the card 1312. Each task action may be associated with parameters such as conditions in which the task action is to be executed. For example, for task action 1312 "filling in the card," the condition may be filling the current package status into an answer card when a question about the package status is asked by the person or filling the current package status into a notice card of package status update without waiting for any input from the person. Some task actions (e.g., 1302, 1304) may be executed by retrieving relevant information from the person-centric space 200 and/or the person-centric knowledge database 532, while some task actions (e.g., 1308) need to be completed in the public space 108. It is understood that the example described above is for illustrative purpose and are not intended to be limiting.

Figure 14:
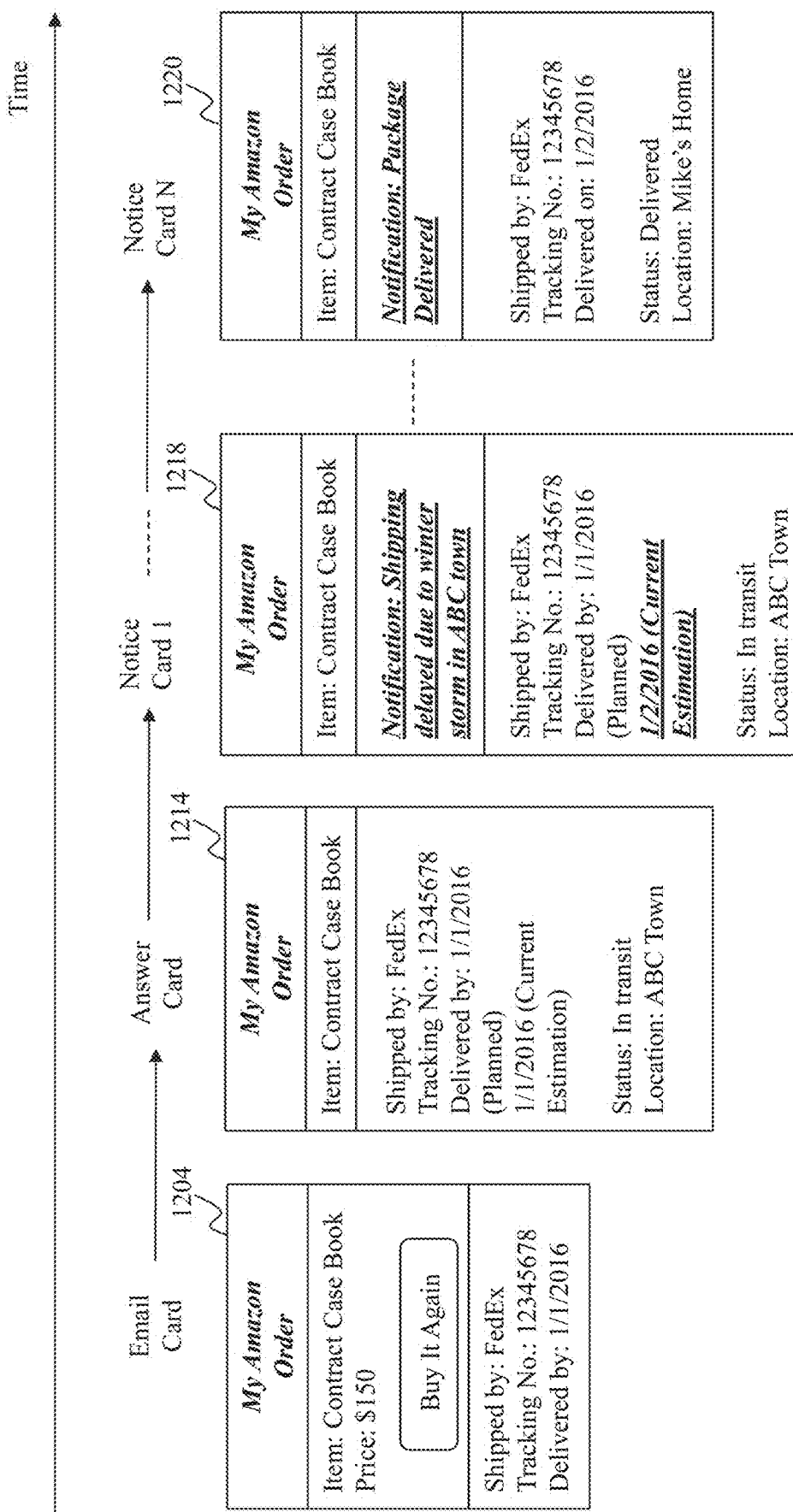
FIG. 14 illustrates a series of exemplary cards provided to a person in the process of automatic online order email summary and package tracking.

FIG. 14 illustrates a series of exemplary cards provided to a person in the process of automatic online order email summary and package tracking In this example, the email card 1204 is automatically generated responsive to receiving the amazon order confirmation email 1202 and summarizes the email 1202 based on the entities extracted from the email 1202 and relationships thereof. The email card 1204 includes a header module "My Amazon Order" and an order module with entities of item and price. A "buy it again" action button may be added in the order module. The email card 1204 also includes a shipping module with entities of shipping carrier, tracking number, and scheduled delivery date.

In this example, the answer card 1214 is generated in response to a question from the person about the status of the package. The answer card 1214 includes the header module and order module (but with less information as the order information is not a direct answer to the question). The answer card 1214 includes a shipping module with rich information related to shipping, which is retrieved from both the private email 1202 and FedEx 1208. The information includes, for example, entities of shipping carrier, tracking number, and scheduled delivery date from the private email 1202, and current estimated delivery date, status, and location from FedEx 1208.

In this example, multiple notice cards 1218, 1220 are automatically generated in response to any event that affects the status of the package. Each notice card 1218, 1220 includes an additional notification module. If any other information is affected or updated due to the event, it may be highlighted as well to bring to the person's attention. In notice card 1 1218, shipment is delayed due to a winter storm in ABC town and as a consequence, the current estimated delivery date is changed according to information retrieved from FedEx 1208. According to notice card N 1220, the package has been delivered to Mike's home. It is understood that the examples described above are for illustrative purpose and are not intended to be limiting.

Figure 15:
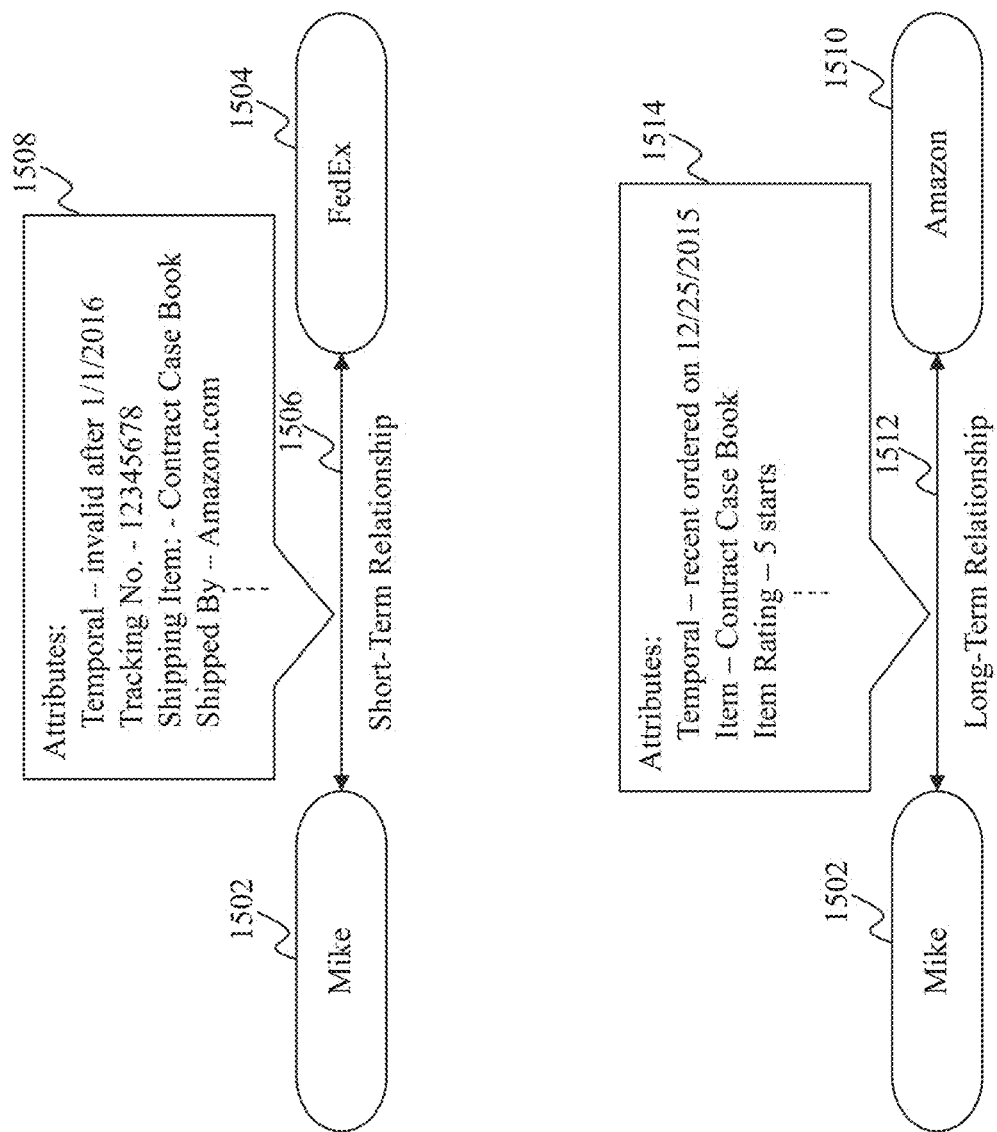
FIG. 15 illustrates exemplary entities extracted from a person-centric space and their relationships established in the process of automatic online order email summary and package tracking.

FIG. 15 illustrates exemplary entities extracted from a person-centric space and their relationships established in the process of automatic online order email summary and package tracking. As described above, the person-centric knowledge database 532 stores person-centric knowledge organized in the form of entity-relationship-entity triples. Entities extracted from the amazon order confirmation email 1202 are formed into entity-relationship-entity triples by the knowledge engine 530. In the example of FIG. 15, entity "Mike" 1502 from the recipient field of the email 1202 is determined as the person using the person-centric INDEX system 202, and entity "FedEx" 1504 is determined as a shipping carrier with a short-term relationship 1506 with entity "Mike" 1502. Attributes 1508 may be associated with the relationship 1506 including, for example, temporal attribute, tracking number, shipping item, sender, etc. These attributes may include related entities extracted from the email 1202 and any other attributes inferred based on the relationship 1506. It is noted that the relationship 1506 between entity "Mike" 1502 and entity "FedEx" 1504 is a short-term, temporary relationship in the sense that the relationship 1506 will become invalid after the shipment is completed, as indicated by the temporal attribute. In this example, entity "Mike" 1502 and another entity "Amazon" 1510 establish a long-term relationship 1512 with a different set of attributes 1514 thereof. The attributes 1514 include, for example, the temporal attribute, item, item rating, and so on. The relationship 1512 is long-term in this example because Mike has been repeatedly ordered goods from Amazon, which has become his behavior pattern or preference. It is understood that the examples described above are for illustrative purpose and are not intended to be limiting.

More detailed disclosures of various aspects of the person-centric INDEX system 202 are covered in different U.S. patent applications, entitled "Method and system for associating data from different sources to generate a person-centric space," "Method and system for searching in a person-centric space," "Methods, systems and techniques for providing search query suggestions based on non-personal data and user personal data according to availability of user personal data," "Methods, systems and techniques for personalized search query suggestions," "Methods, systems and techniques for ranking personalized and generic search query suggestions," "Method and system for entity extraction and disambiguation," "Method and system for generating a knowledge representation," "Method and system for generating a card based on intent," "Method and system for dynamically generating a card," "Method and system for updating an intent space and estimating intent based on an intent space," "Method and system for classifying a question," "Method and system for providing synthetic answers to a personal question," "Method and system for automatically generating and completing a task," "Method and system for online task exchange," "Methods, systems and techniques for blending online content from multiple disparate content sources including a personal content source or a semi-personal content source," and "Methods, systems and techniques for ranking blended content retrieved from multiple disparate content sources." The present teaching is particularly directed to blending and ranking of information from multiple disparate sources including user's personal data sources and non-personal data sources.

In a typical online search system, a search engine may receive as input an explicit search query from a user and/or determine a user's intended need/query for information based on the user's intent (e.g., using the user's previous queries, etc.) and other contextual information (e.g., user's location, etc.). In response to the explicit query and/or implicit query, a search engine typically conducts a search on the indexed, publicly-available information databases accessible via the Internet and/or search on native advertisements. Information resources or documents produced as results of the search are ranked according to their relevance to the query as determined by the search engine, and the results are presented to the user in the ranking order.

Additionally, a user's explicit query and/or implicit query may be also be executed over non-public data sources, e.g., personal data sources such as emails, personal documents in a cloud storage service, etc. However, the information or documents retrieved from such non-public sources may have features, attributes, or metadata which are different from that of information or documents from public sources. For example, attributes related to retrieved a user's emails may include email sender information in the emails, specific email terms, etc., whereas attributes related to retrieved public information may include page rank, etc. As such, information retrieved from multiple disparate sources may be incompatible in terms of aggregating or consolidating such dissimilar, but relevant information into a unified ranked stream of search results for the user to consume.

In accordance with the various embodiments of the present disclosure, the techniques disclosed herein may be implemented as part of a search engine that is configured to conduct searches for users' (explicit or implicit) queries on multiple different data sources and present search results to the users in a unified ranked format. The teachings disclosed herein relate to methods, systems, and programming for blending and ranking content or information obtained from multiple different data sources, including public data sources, private/personal data sources, and semi-private/personal data sources, in response to a search query. In some embodiments, the content blending and ranking includes normalizing the features or attributes associated with each distinct article of content using on a common feature space. The blending and ranking process may also utilize other factors such as user profiles, trending features, query-based lexical features, collaborative features, contextual information, etc. In some embodiments of the present disclosure, the retrieved content or information is blended, ranked, and presented to the user in a unified format in accordance with a determined relevance of the content to the user's query.

Figure 16:
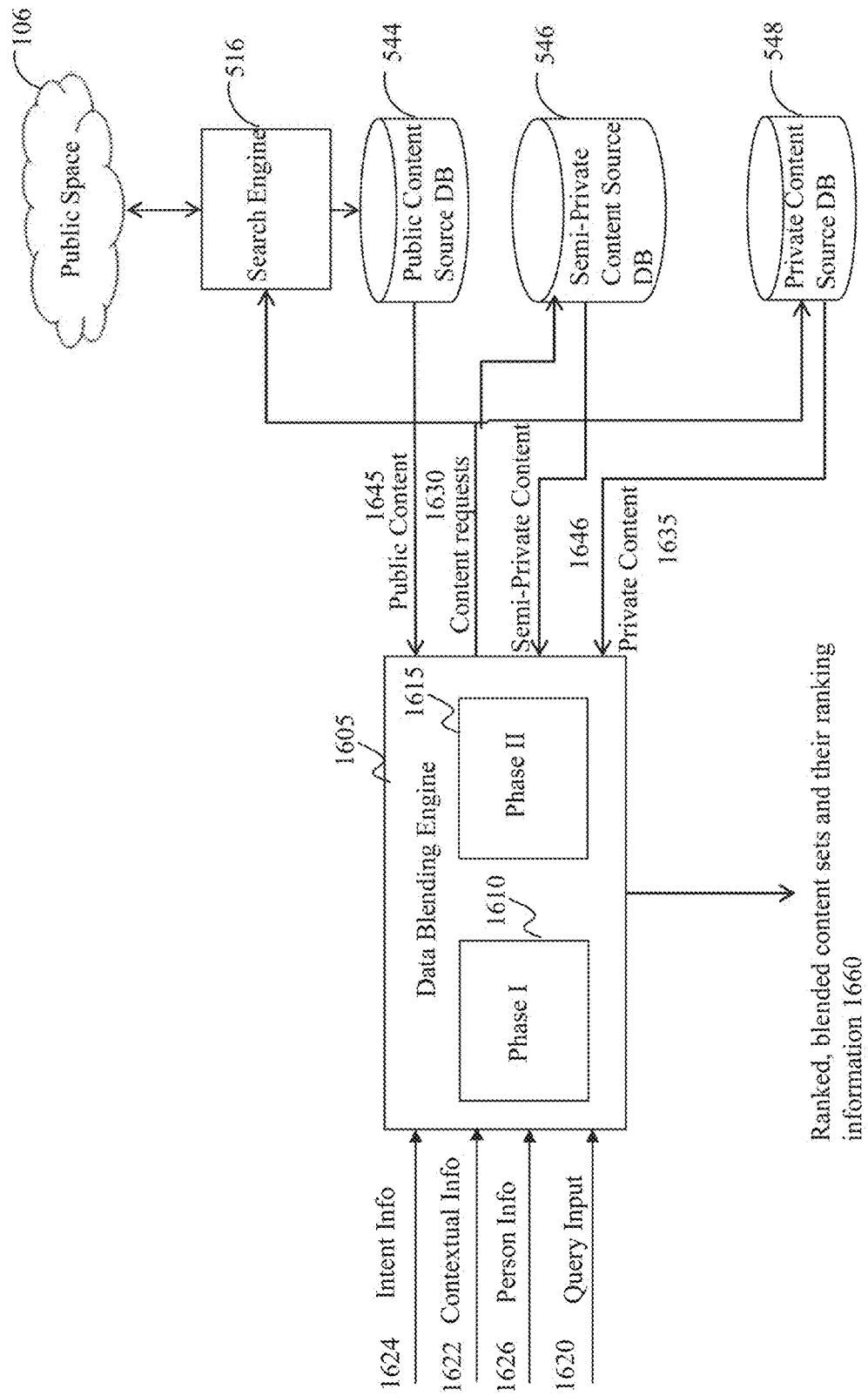
FIG. 16 is an exemplary system diagram of a system for blending content from disparate content sources, according to an embodiment of the present teaching.

FIG. 16 illustrates a high level exemplary system for blending and ranking content or information obtained from multiple different data sources, including public data sources, private/personal data sources, advertisement databases, and semi-private/personal data sources, according to various embodiments of the present teaching. In one embodiment, this exemplary content/data blending and ranking system is deployed as part of the person-centric INDEX system 202, and for example, specifically, as part of the person-centric knowledge retriever 526. As illustrated, in some embodiments, the content/data blending system includes a data blending engine 1605, which, in some embodiments, has a two-phase implementation—"Phase I" 1610 and "Phase II" 1615. The data blending engine 1605 is configured to receive query input 1620 from the person 102 (e.g., textual data provided and processed via the interface 502, the query interface 506 and/or the Q/A interface 508). The data blending engine 1605 may also receive as inputs contextual information 1622 from the contextual information identifier module 512, intent information 1624 from intent engine 524, and other person-specific information 1626 (e.g., a person's biographical information, location, etc.) from the person database 514. In some embodiments, in addition to, or in the absence of, the query input 1620, the contextual information 1622 and/or the intent information 1624 may be processed as the input based on which the data blending engine 1605 requests, obtains, and processes content/data from various different sources.

In some embodiments, before or as part of Phase I 1610, the blending engine 1605 formulates content requests 1630 for relevant content or data based on the input, after which the content requests 1630 are sent to different content sources in different domains (e.g., within the person-centric space 200). For example, the blending engine 1605 may send the content requests 1630 for content or data to private content source database 548 (including, e.g., email data of the person 102) and/or semi-private content source database 546 (including, e.g., content related to the person 102's Twitter, Facebook, LinkedIn accounts, etc.). Further, if, based on the input, the data blending engine 1605 determines that content from the general public Internet is required to fulfill the requested information, the data blending engine 1605 may submit the content requests to the search engine 516, which may conduct the content search on and obtain the relevant content from the public space 108. The public content may then be stored in the public content source database 544.

Further, as part of Phase I 1610, the relevant private content 1635 and related metadata, the relevant semi-private content 1646 and related metadata, and/or the relevant public content 1645 and related metadata from their respective content source databases are provided to the data blending engine 1605. The data blending engine 1605 may process the received content and metadata from each specific content source (e.g., email, Twitter, the Internet, etc.) to extract a set of attributes related to that specific content source, and generate a relevance score indicating a degree of relevance of the particular content from the specific content source to the input. In some embodiments, the information related to the content received from the content source database includes a relevance score of the content as determined by the content provider of that content.

In some embodiments, in Phase II 1615, the retrieved content sets, related attribute sets, and relevance scores are processed so as to normalize the attribute sets of the content sets on a common feature space, and using the normalized feature sets, blend and rank the content sets. In another embodiment, the relevance scores may be calibrated, and the calibrated relevance may be used to blend and rank the content sets. The ranked and blended content sets and their ranking information 1660 may be provided to the dynamic card builder 528, Q/A engine 518, query interface 506, etc., to arrange the content in a particular format and provide to the person 102 via the interface 502. Accordingly, using the techniques described herein, the blended and ranked content in response to an input related to the person 102 are presented to the person 102 in a unified format while optimal for the person's relevance.

In the context of the instant disclosure, because the content is provided to a specific person 102 based on his or her input, it is assumed that the person is logged into the INDEX system 202 and/or the data blending engine 1605 using a unique person ID for the person 102. The unique person ID may be provided as part of the person information 1626 to the data blending engine 1605. As such, based on the unique person ID, the data blending engine 1605 (and other components of the system) handles content requests, retrieved content, and associated databases that are tied to that unique person ID.

Figure 17:
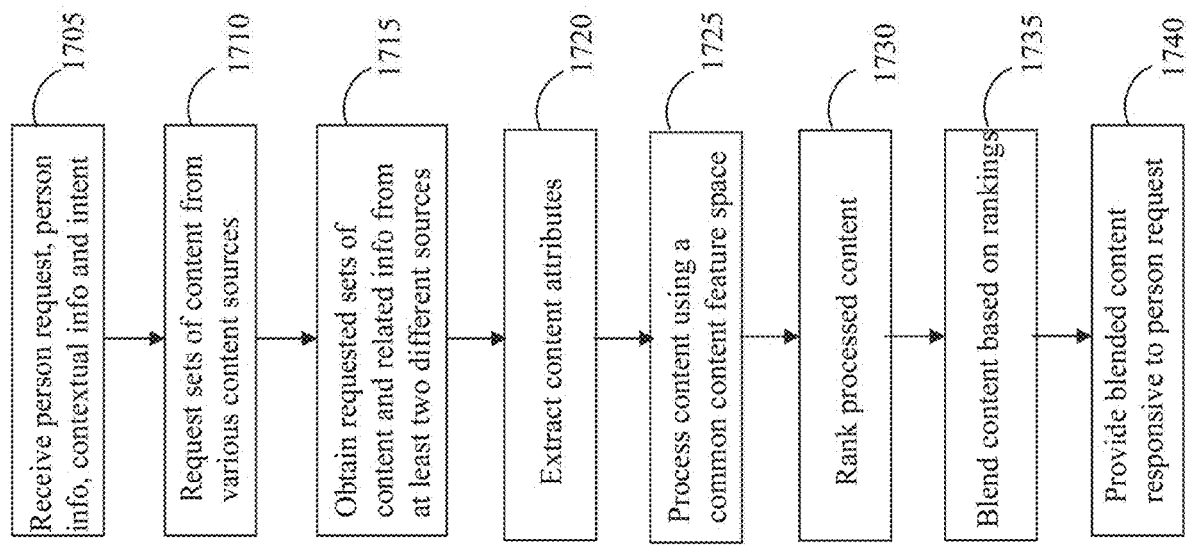
FIG. 17 depicts an exemplary process for blending content from disparate content sources, according to an embodiment of the present teaching.

FIG. 17 is a flowchart of an exemplary process operated or performed by a content blending system to blend and rank content from multiple disparate content sources, according to an embodiment of the present disclosure. Starting at 1705, input (e.g., textual input via the interface 502) is received from the person 102. In the same operation, other inputs such as intent, contextual information, and other person-specific information are received. At 1710, based on the received input, contextual information, and person-related inputs, requests for content from multiple disparate content sources are formulated and sent to the related content source databases and/or the search engine. At 1715, the requested sets of content (including public content, private content, and/or semi-private content) and other related information are obtained from multiple disparate content sources. In some embodiments, the information related to the content from the content source database includes a relevance score of the content as determined by the content provider of that content.

At 1720, an attribute set specific to each content set is extracted based on a model that is specific to that type of content. At 1725, the content attribute set of each content set is mapped onto a common feature space so that all of the content sets from the disparate content sources are normalized for ranking purposes. Based on the normalized feature sets, at 1730, the content sets are ranked, and at 1735, the ranked content sets are blended to form one coherent and relevant stream of content items that is provided (at 1740) for the person 102 to consume.

Figure 18:
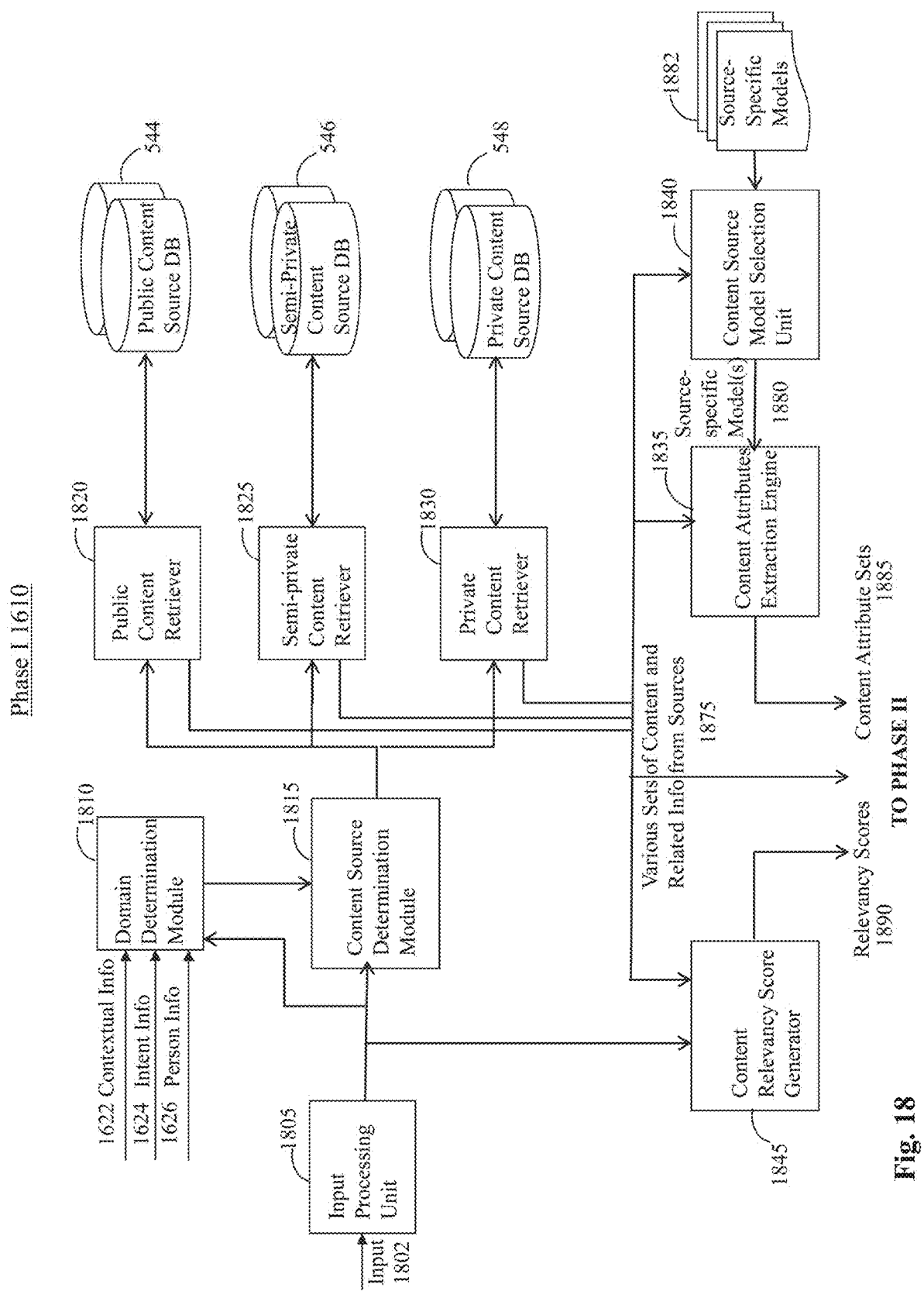
FIG. 18 is an exemplary system diagram of an implementation of a phase I of a content blending technique, according to an embodiment of the present teaching.

FIG. 18 is an exemplary system diagram of an implementation of the Phase I 1610, according to an embodiment of the present teaching. As illustrated, the implementation may include an input processing unit 1805, a domain determination module 1810, a content source determination module 1815, a public content retriever 1820, a semi-private content retriever 1825, a private content retriever 1830, a content attributes extraction engine 1835, a content source model selection unit 1840, and a content relevancy score generator 1845.

The input processing unit 1805 may receive input 1802 from the data blending engine 1605 and provide the input 1802 to the domain determination module 1810 and the content source determination module 1615. The input 1802 at the input processing unit 1805 may be composed of the query input 1620 provided by the person 102 and/or the contextual information 1622, the intent information 1624, etc. The domain determination module 1810 may receive, in addition to the input 1802 from the input processing unit 1805, contextual information 1622, intent information 1624, and/or other person-specific information 1626. Based on all the received inputs, the domain determination module 1810 may determine the domain(s) or type(s) of information to be requested and retrieved from one or more content sources to respond to the person 102's need indicated in the input 1802. For example, based on the inputs, the domain determination module 1810 may determine that the person 102's need is directed to public content and private content, but not semi-private content. As such, in this example, the domain determination module 1810 determines that one or more content sources in each of the public content source database 544 and the private content source database 548 have to be accessed to obtain relevant content to present to the person 102.

The domain determination module 1810 may provide the determination regarding the domain(s) or type(s) of information to the content source determination module 1815, which also receives input 1802 from the input processing unit 1805. Based on its received input and information, the content source determination module 1815 may determine specific content sources within the public, semi-private and private domains that are to be accessed for relevant content. For example, if it is determined that one or more content sources in public and private domain are to be accessed, based on the particulars in the input 1802, the content source determination module 1815 may determine that content related to Wikipedia.com stored at the public content source database 544, and content related to the person 102's email stored at the private content source database 548 are to be requested and obtained for the person 102's consumption.

The information regarding the specific content sources that are to be accessed is sent to the public content retriever 1820, the semi-private content retriever 1825, and the private content retriever 1830, each of which retrievers then formulate an appropriate request for specific content related to the input 1802 from respective content source databases 544, 546 and 548. For example, it the determination from the content source determination module 1815 indicates that Wikipedia-related content is to be fetched, the public content retriever 1820 generates a request for specific Wikipedia articles and sends the request to the public content source database 544. Similarly, it the determination from the content source determination module 1815 indicates that email-related content is to be fetched, the private content retriever 1830 generates a request for specific emails and sends the request to the private content source database 548. In response to the requests from the retrievers 1820, 1825 and 1830, the content source databases 544, 546 and 548 may provide relevant sets of content 1875 from specific content sources to the retrievers 1820, 1825 and 1830, respectively. Each of the retrieved sets of content 1875 may be related to one particular content course (e.g., Wikipedia articles, emails, Twitter feed, etc.) and may be different from the rest of the sets of content 1875 (from within the same source database or from another source database) in terms of its format, information contained therein, and/or related metadata. As such, even though the system may be informed of the context, intent and content query related to the person 102, because of the disparate attributes of the retrieved sets of content 1875 (e.g., Wikipedia articles, emails, Twitter feed, etc.), it may not be possible to provide and present the retrieved content in one coherent stream in a particular order of relevance for the person 102's consumption.

Accordingly, to normalize the sets of content 1875, as an initial operation (within Phase I 1610), attributes from each content set 1875 are extracted and a relevancy score is generated for each content set 1875. In some embodiments, the content attributes extraction engine 1835 receives as inputs the sets of content 1875 from the retrievers 1820, 1825 and 1830 and source-specific models 1880, based on which the content attributes extraction engine 1835 extracts content-specific attribute sets 1885 for the content sets 1875. Each source-specific model 1880 may represent characteristics or aspects of each type of content that are essential to that type of content. Each source-specific model 1880 may be selected from among a group of possible models 1882 by the content source model selection unit 1840 based on the content sets 1875 provided thereto. For example, if the content sets 1875 include a Wikipedia content set and an email content set, the content source model selection unit 1840 may select a Web-based encyclopedia-specific model and an email-specific model as models 1880 for attribute extraction by engine 1835.

Figure 19:
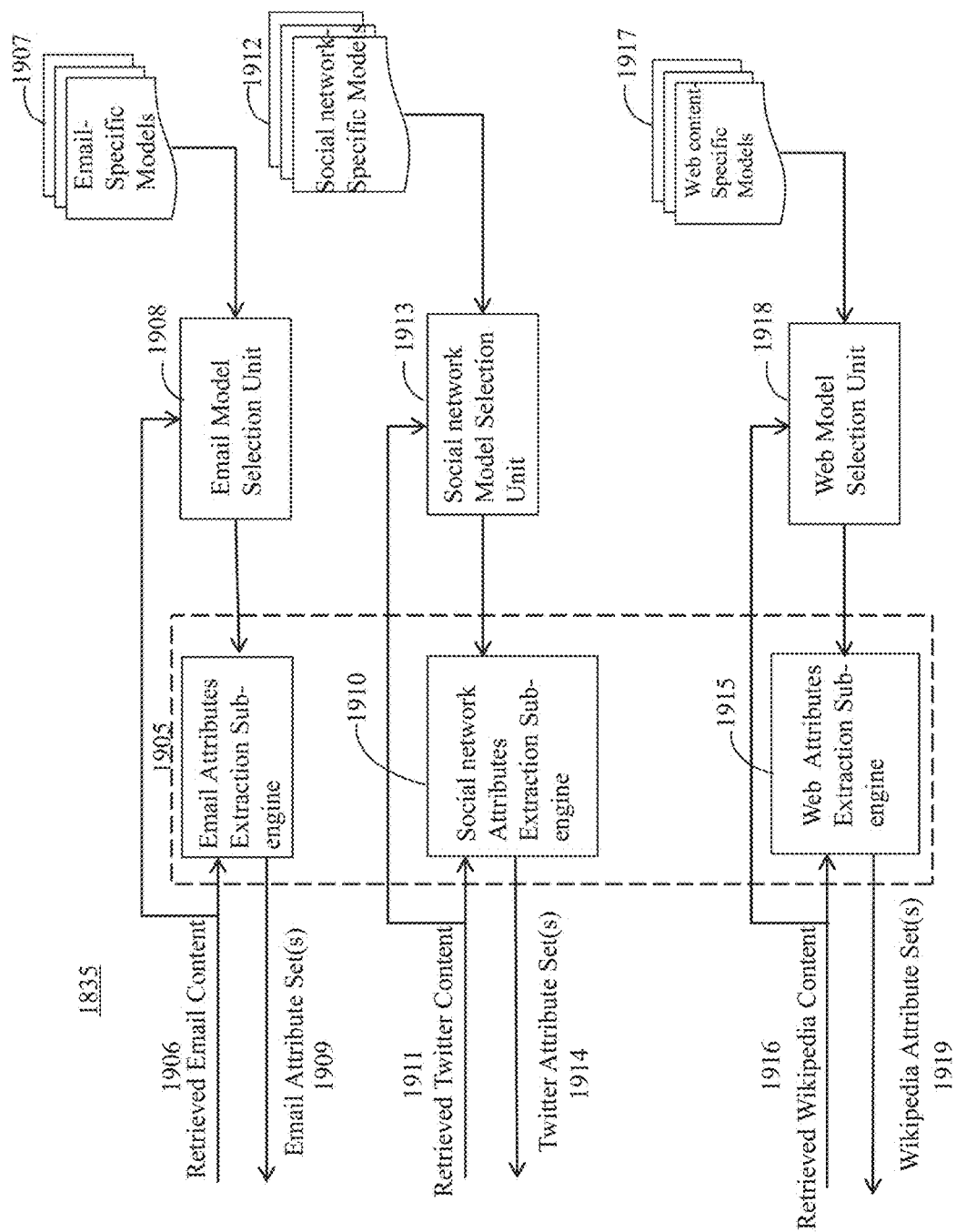
FIG. 19 illustrates content-specific attributes extraction modules, according to an embodiment of the present teaching.
Figure 20:
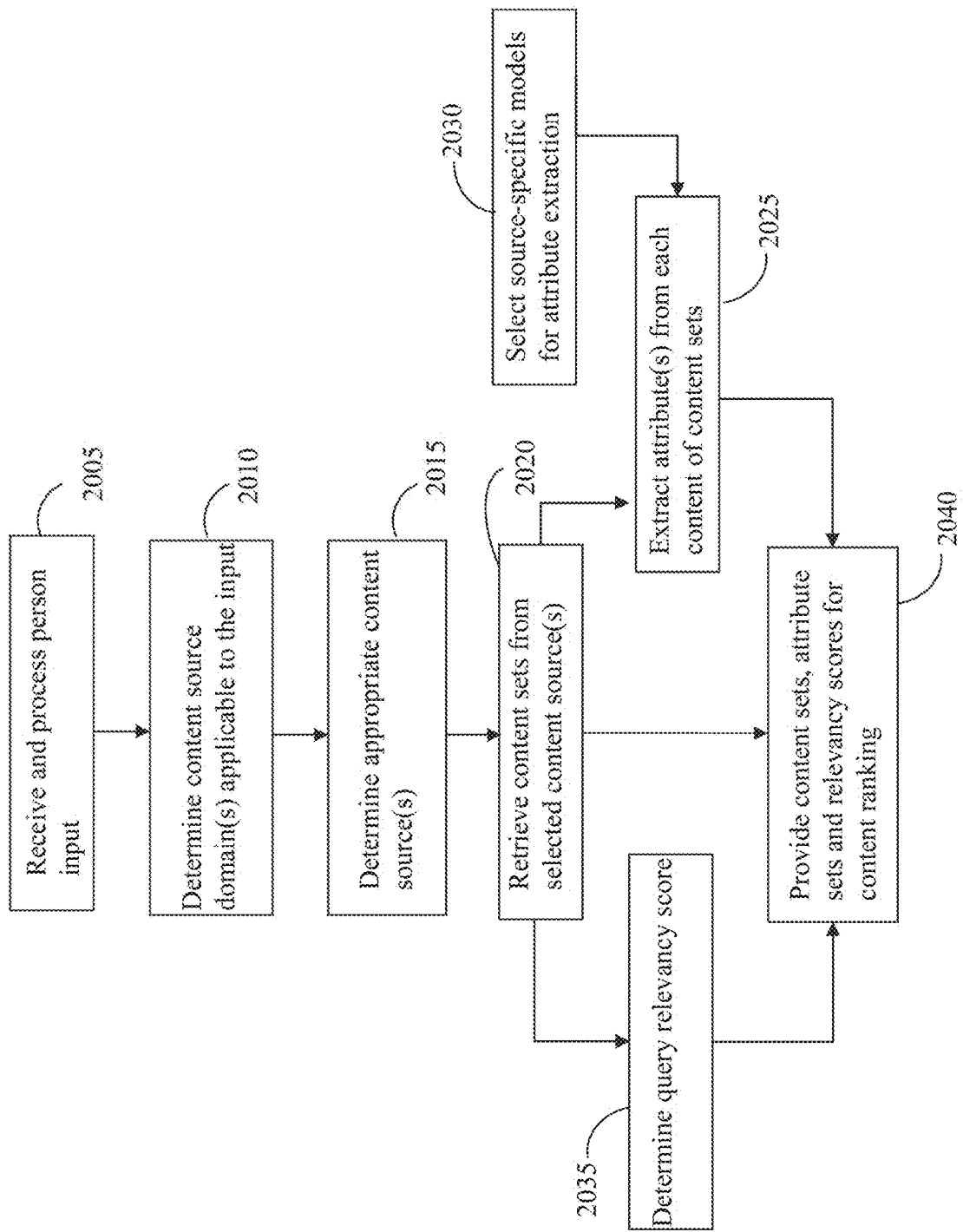
FIG. 20 depicts an exemplary process directed to a phase I of a content blending technique, according to an embodiment of the present teaching.

In some embodiments, the content attributes extraction engine 1835 may utilize one or more of rule-based techniques, machine learning-based techniques, or even manual selection-based techniques to determine and extract specific attributes from the content sets 1875. In some embodiments, the content attributes extraction engine 1835 includes two types of modules—a general sub-engine (not shown) and content-specific sub-engines (shown in FIG. 19). The general sub-engine may process the various sets of content 1875 regardless of the type of content or the type of content source and utilize common extracting methods to extract key terms or keywords as one type of attribute for each of the sets of content 1875. Such common extracting methods include Natural Language Processing (NLP) techniques (Named Entity Recognizer (NER), Part of Speech (POS), Grammar Analysis, etc.), to extract key terms (e.g., keywords from an email subject line and/or body, from a Wikipedia article, and from Twitter or Facebook postings, etc.)

Each content-specific sub-engine, however, may be configured to process content set(s) of one specific content type. For example, referring to FIG. 19, an email attribute extraction sub-engine 1905 may receive and process email content set(s) 1906 (private to the person 102) within the content sets 1875 to extract email-specific attributes 1909 such as, for example, sender's name and email address, recipients' names and email addresses, number of entities in the Cc field of the email, time and date of the email, email service provider information, etc. The email attribute extraction sub-engine 1905 may perform the email-specific attribute extraction based on one of email-specific models 1907 selected by an email model selection unit 1908. In some embodiments, each of the email-specific models 1907 may represent an attribute model that is directed to a particular email provider (e.g., Yahoo! Mail, Gmail, etc.), and as such, based on the email content set(s) 1906 in the content sets 1875, the email model selection unit 1908 may select an appropriate email-specific model 1907.

Similarly, a social network attributes extraction sub-engine 1910 may receive and process social network-based content set(s), e.g., Twitter-based content set(s) 1911 (semi-private to the person 102) within the content sets 1875 to extract social network-specific attributes. For example, the social network attributes extraction sub-engine 1910 may be configured to extract Twitter-specific attributes 1914 such as, for example, trending status of the tweets, number of hashtags, number of retweets of the tweets, name and Twitter handle of the tweet originator, etc. The social network attribute extraction sub-engine 1910 may perform the social network-specific attribute extraction based on one of social network-specific models 1912 selected by a social network model selection unit 1913. In some embodiments, each of the social network-specific models 1912 may represent an attribute model that is directed to one particular social network (e.g., Twitter, Facebook, Instagram, etc.). As such, based on the received social network content set(s), e.g., Twitter content set(s) 1911 in this example, the social network model selection unit 1913 may select an appropriate social network-specific model 1912, e.g., Twitter-specific model in this example. Further, a web attributes extraction sub-engine 1915 may receive and process web-based (public) content set(s), e.g., Wikipedia content set(s) 1916, to extract web-based attributes 1919, such as, page rank, complete URL, number of hyperlinks within the content, etc. The web attributes extraction sub-engine 1915 may perform the web content-specific attribute extraction based on one of web content-specific models 1917 selected by a web model selection unit 1918. The attribute sets 1909, 1914 and 1919 constitute the content-specific attribute sets 1885. Referring back to FIG. 18, in some embodiments, the content relevancy score generator 1845 is configured to predict how relevant each of the content sets 1875 is to the person 102's information need (as indicated in the input 1802), and generate a relevancy score 1890 for each of the content sets 1875. The relevancy scores 1890 may be determined based on relevancy degree indicators that are provided along with the respective content sets 1875 by the respective content source.

Figure 22:
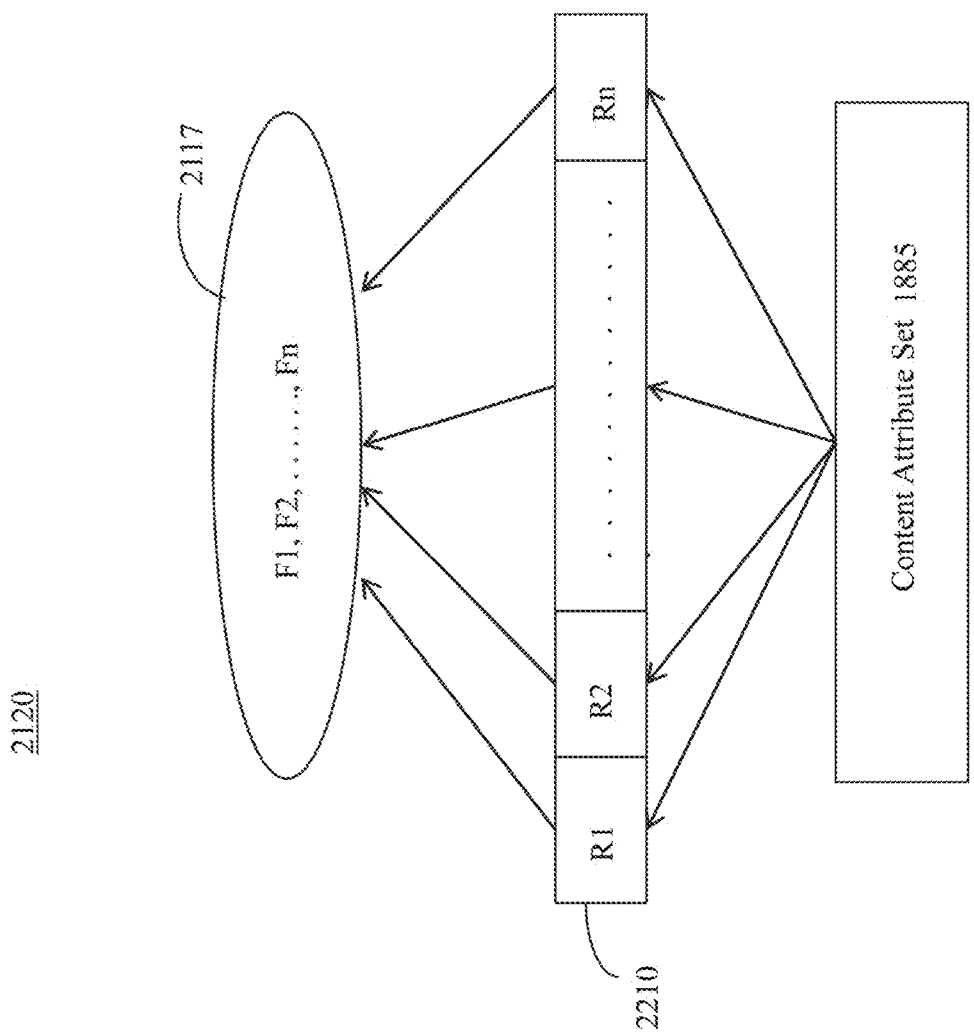
FIG. 22 depicts a technique of mapping attributes to a common feature space, according to an embodiment of the present teaching.

FIG. 22 is a flowchart of an exemplary process operated or performed as part of the Phase I 1610, according to an embodiment of the present disclosure. Starting at 2005, input 1802 is received, processed and provided for determining relevant content source domain(s) and specific content source(s) within the determined domain(s). At 2010, the domain(s) or type(s) of information to be requested and retrieved from one or more content sources may be determined by the domain determination module 1810 to respond to the person 102's need indicated in the input 1802. At 2015, specific content sources within the public, semi-private and private domains that are to be accessed for relevant content may be determined/selected by the content source determination module 1815. At 2020, content sets 1875 are retrieved by the retrievers 1820, 1825 and 1830 from the selected specific content sources in the databases 544, 546, and 548. At 2025, an attribute set 1885 from each of the content sets 1875 is extracted by the content attributes extraction engine 1835 based on an appropriate source-specific model 1882 selected (at 2030) by the content source model selection unit 1840. At 2035, relevancy scores 1890 for the content sets 1875 are generated, and at 2040, the content sets 1875, the attribute sets 1885 and the relevancy scores 1890 are provided to Phase II 1615 for content normalization, ranking and blending.

Figure 21:
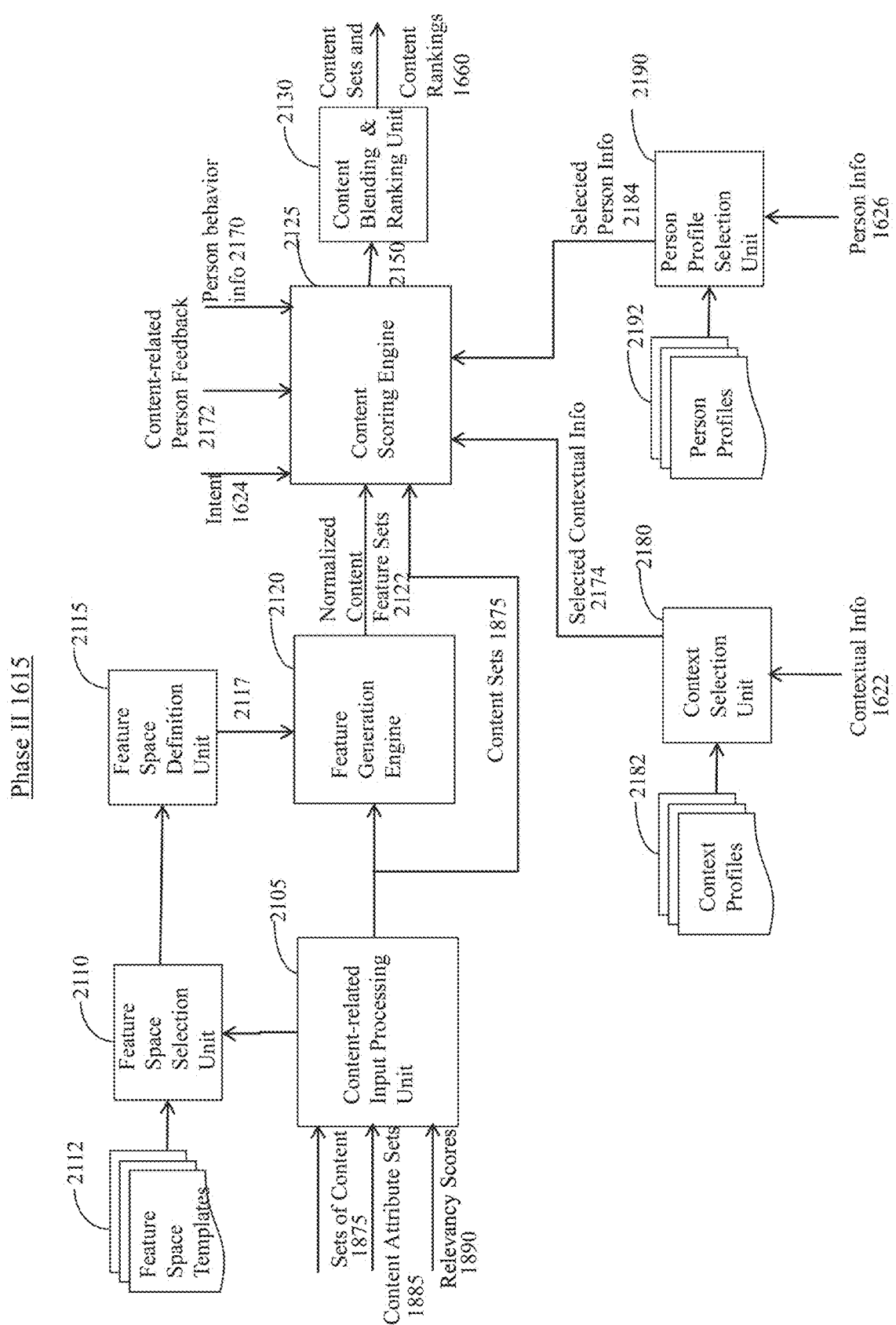
FIG. 21 is an exemplary system diagram of an implementation of a phase II of a content blending technique, in accordance with an embodiment of the present teaching.

FIG. 21 is an exemplary system diagram of an implementation of Phase II 1615, according to an embodiment of the present teaching. As illustrated, the implementation may include a content-related input processing unit 2105, a feature space selection unit 2110, a feature space definition unit 2115, a feature generation engine 2120, a content scoring engine 2125, a content blending and ranking unit 2130, among other components. The content-related input processing unit 2105 receives from Phase I 1610 and performs an initial processing of the content sets 1875, the attribute sets 1885 and the relevancy scores 1890. In some embodiments, in order to normalize the disparate sets of content 1875 (with disparate attribute sets 1885), as an initial operation (within Phase II 1615), a feature space having a common feature set applicable to all of the disparate sets of content 1875 may be selected and defined. In that regard, in some embodiments, the content-related input processing unit 2105 provides the content sets 1875, the attribute sets 1885 and the relevancy scores 1890 to the feature space selection unit 2110, which may select one of the feature space templates 2112 based on the received information.

Each feature space template 2112 may include a unique set of features that correspond to the combination of the types of content in content sets 1875. For example, one of the feature space templates 2112 may represent a feature set over which attributes of email-based content and Twitter-based content may be normalized for content blending purposes, and another of the feature space templates 2112 may represent a feature set over which attributes of Facebook-based content and Wikipedia-based content may be normalized for content blending purposes. Other feature space templates 2112 may represent other possible combinations of private, semi-private and public content types.

In some embodiments, within the selected feature space template 2112, the feature space definition unit 2115 may further define specific features that are incorporated into the common feature space 2117. For example, based on the number of attributes in the attribute sets 1885, the total numbers of features in the selected feature space template 2112 may be restricted to a predefined number, and as such one or more of the features in the selected feature space template 2112 may be discarded to finalize the common feature space 2117. The feature generation engine 2120 may receive the common feature space 2117 and inputs (the content sets 1875, the attribute sets 1885 and the relevancy scores 1890) from the input processing unit 2105. In some embodiments, the feature generation engine 2120 is configured to normalize the disparate attribute sets 1885 of disparate content sets 1875 (obtained from disparate content sources) over the common feature space 2117. As part of the normalization, the feature generation engine 2120 may be configured to map each of the attribute sets 1885 onto the common feature space 2117 to generate a corresponding normalized content feature set 2122.

An example of mapping an attribute set 1885 to the common feature space 2117 implemented at the feature generation engine 2120 is illustrated in FIG. 22. In the illustrated embodiment, one of the attribute sets 1885 is provided as an input to each of multiple feature generation or mapping methods 2210 Mi (i=1, 2, . . . , n), where each method 2210 Mi corresponds to one feature Fi (i=1, 2 . . . , n) of the common feature space 2117. Each method 2210 may be a rule-based linear combination process or a probabilistic model that is trained from a specific training data set, which method is used to convert the values of the attribute set 1885 into one or more values of the features in the common feature space 2117. There may or may not be a one-to-one correspondence between an attribute and a feature, and instead, one feature Fi value may represent multiple attributes and/or one attribute may be represented by multiple features F. Accordingly, the output of the feature generation engine 2120 include the normalized content feature sets 2122 each one of which corresponds to one of the attribute sets 1885.

In some embodiments, using the normalized content feature sets 2122, the content scoring engine 2125 generates or estimates a rank score 2150 for each of the content sets 1875, where the rank score 2150 represents a level of relevance of that content set to the (query or contextual) input 1620 indicating the person 102's information need. For example, a higher rank score indicates a higher level of relevance of the content type to the input 1620. The content scoring engine 2125 may generate or estimate a rank score 2150 for each of the content sets 1875 based on an average value (or any other statistical value such as variance, etc.) of the features in the corresponding feature set 2122. Alternatively or additionally, the content scoring engine 2125 may generate or estimate a rank score 2150 for each of the content sets 1875 on a predefined scale (e.g., scale of 1 through 100) based on the highest feature value in each feature set 2122. For example, for each content set 1875, the content scoring engine 2125 computes the rank score 2150 as the highest feature value of the feature set 2122 (corresponding to the content set 1875) mapped on to the scale of 1-100, such that the rank score 2150 is a value between 1 and 100.

In some embodiments, to generate the rank scores 2150, the content scoring engine 2125, in addition to considering the feature sets 2122, may receive and consider other information such as intent 1624, selected contextual information 2174, selected person information 2184, person 102's recorded past online behavior information 2170 (in terms of clicking, viewing and/or converting the presented content), content-related feedback 2172 from the person 102 and/or other persons in terms of how accurately the content type and relevance of content were estimated for previous queries. In some embodiments, for each content set 1875, the content scoring engine 2125 may compute a linear combination of a statistical value of the feature values of the corresponding feature set 2122 and the values of the other received information 1624, 2174, 2184, 2170 and 2172 to generate a rank score 2150 for that content set 1875. In some embodiments, the selected contextual information 2174 may be selected by context selection unit 2180 based on the contextual information 1622 and one of context profiles 2182. The selected person information 2184 may be selected by person profile selection unit 2190 based on the person information 1626 and one of person profiles 2192.

In some embodiments, the rank scores 2150 for the content sets 1875 are provided to the content blending and ranking unit 2130, which is configured to sort the content sets 1875 in accordance with their respective rank scores 2150, e.g., in the ascending order or the descending order of the rank scores 2150. Further, the content blending and ranking unit 2130 blends or incorporates all of the normalized content sets 1875 in a single stream of information in the determined ranked order. Accordingly, even though due to the disparate nature of the content sources, the retrieved content sets 1875 were different and incompatible with each other so as to be processed and blended in a single stream of information, the content blending and ranking unit 2130 is able to utilize the rank scores 2150 for the normalized content sets to blend the disparate content sets 1875 in a particular ranked order of estimated relevance for the person 102's consumption.

Figure 23:
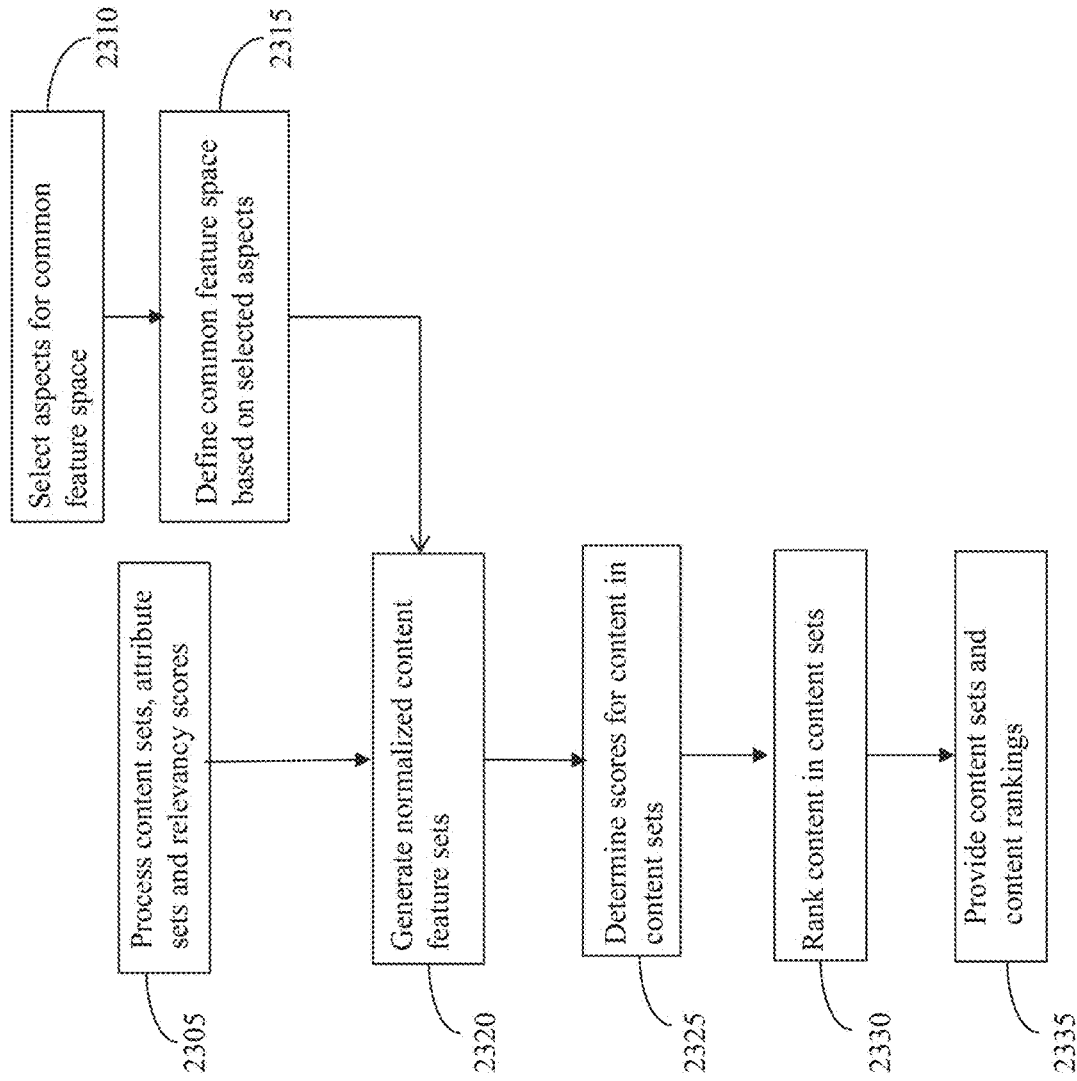
FIG. 23 is an exemplary system diagram of an implementation of a phase II of a content blending technique, in accordance with an embodiment of the present teaching.

FIG. 23 is a flowchart of an exemplary process operated or performed as part of the Phase II 1615, according to an embodiment of the present disclosure. Starting at 2305, the content sets 1875, the attribute sets 1885 and the relevancy scores 1890 are received, processed and provided for generating normalized content feature sets. At 2310, a common feature space having a common feature set applicable to all of the disparate sets of content 1875 may be selected, and at 2315, the common feature space 2117 is defined specifically with regard to, for example, the content sets 1875 and the attribute sets 1885. At 2320, each of the attribute sets 1885 are mapped onto the common feature space 2117 to generate a corresponding normalized content feature set 2122. At 2325, a rank score 2150 for each of the content sets 1875 is generated by the content scoring engine 2125, where the rank score 2150 represents a level of relevance of that content set to the (query or contextual) input 1620 indicating the person 102's information need. At 2330, the content sets 1875 are sorted, ranked and blended in accordance with their respective rank scores 2150, e.g., in the ascending order or the descending order of the rank scores 2150, and at 2335, the blended content sets are provided, for example, to other components of the INDEX system 202 to be processed and arranged in a format (e.g., in a card) that is presented to the person 102.

Figure 24:
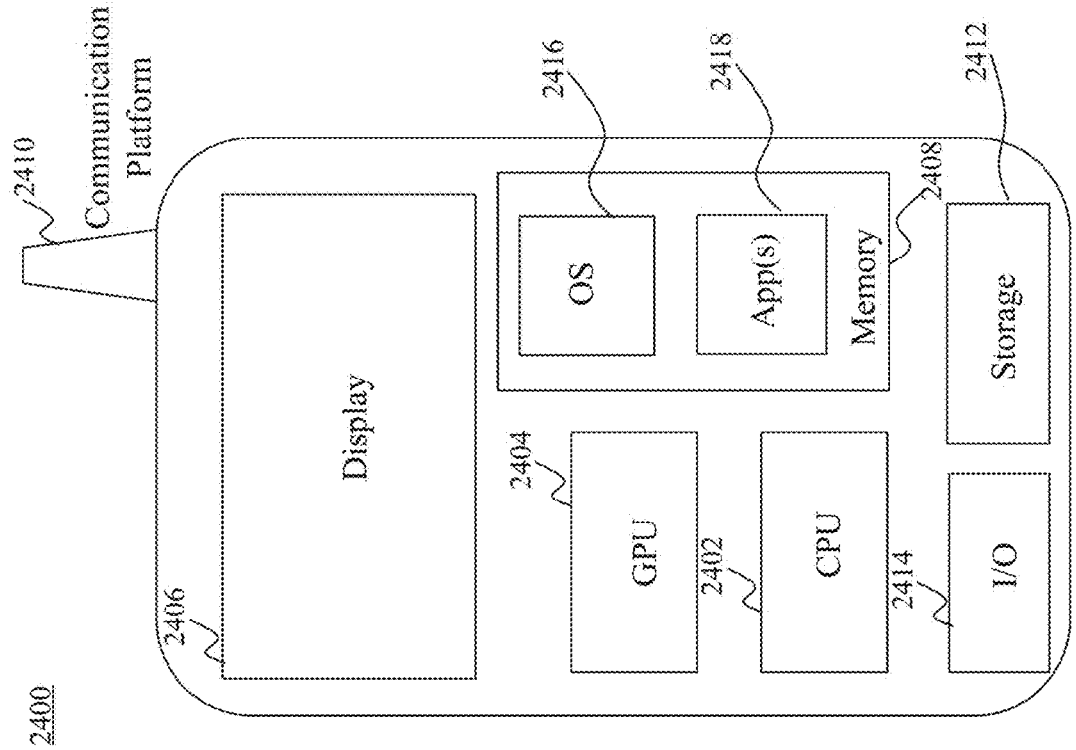
FIG. 24 depicts an architecture of a mobile device which can be used to implement a specialized disparate content blending system incorporating teachings of the present disclosure.

FIG. 24 depicts the architecture of a mobile device, which can be used to realize a specialized system implementing the present teaching. In this example, the personal device on which content and query responses are presented and interacted with is a mobile device 2400, including, but not limited to, a smartphone, a tablet, a music player, a handheld gaming console, a global positioning system (GPS) receiver, a wearable computing device (e.g., eyeglasses, wrist watch, etc.), or any other form. The mobile device 2400 in this example includes one or more central processing units (CPUs) 2402, one or more graphic processing units (GPUs) 2404, a display 2406, memory 2408, a communication platform 2410, such as a wireless communication module, storage 2412, and one or more input/output (I/O) devices 2414. Any other suitable components, including, but not limited to, a system bus or a controller (not shown), may also be included in the mobile device 2400. As shown in FIG. 24, a mobile operating system 2416, e.g., iOS, Android, Windows Phone, etc., and one or more applications 2418 may be loaded into the memory 2408 from the storage 2412 in order to be executed by the CPU 2402. The applications 2418 may include a browser or any other suitable mobile apps for receiving and rendering content streams and advertisements on the mobile device 2400. User interactions with the content streams, query responses, and advertisements may be achieved via the I/O devices 2414 and provided to the components of the content blending system, and generally, to the INDEX system 202.

To implement various modules, units, and their functionalities described in the present disclosure, computer hardware platforms may be used as the hardware platform(s) for one or more of the elements described above. The hardware elements, operating systems, and programming languages of such computers are conventional in nature, and it is presumed that those skilled in the art are adequately familiar therewith to adapt those technologies to normalize, rank and blend disparate content from multiple different content sources. A computer with person interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 25:
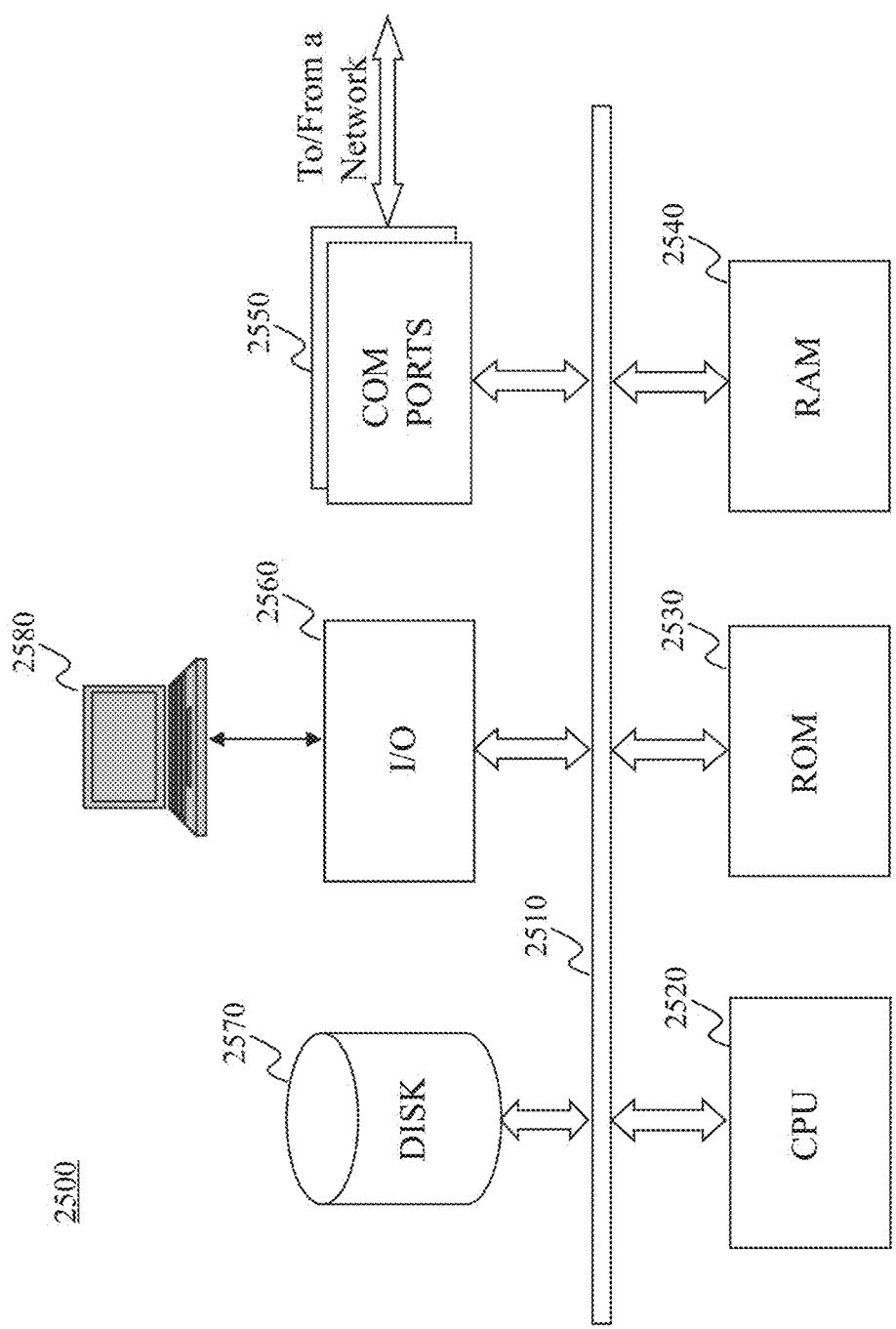
FIG. 25 depicts an architecture of a computer which can be used to implement a specialized disparate content blending system incorporating teachings of the present disclosure.

FIG. 25 depicts the architecture of a computing device which can be used to realize a specialized system implementing the present teaching. Such a specialized system incorporating the present teaching has a functional block diagram illustration of a hardware platform that includes person interface elements. The computer may be a general-purpose computer or a special purpose computer. Both can be used to implement a specialized system for the present teaching. This computer 2500 may be used to implement any technique to normalize, rank and blend disparate content from multiple different content sources, as described herein. For example, the data blending engine 1605, etc., may be implemented on a computer such as computer 2500, via its hardware, software program, firmware, or a combination thereof. Although only one such computer is shown, for convenience, the computer functions relating to normalizing, ranking and blending disparate content from multiple different content sources as described herein may be implemented in a distributed fashion on a number of similar platforms, to distribute the processing load.

The computer 2500, for example, includes COM ports (or one or more communication platforms) 2550 connected to and from a network connected thereto to facilitate data communications. Computer 2500 also includes a central processing unit (CPU) 2520, in the form of one or more processors, for executing program instructions. The exemplary computer platform includes an internal communication bus 2510, program storage and data storage of different forms, e.g., disk 2570, read only memory (ROM) 2530, or random access memory (RAM) 2540, for various data files to be processed and/or communicated by the computer, as well as possibly program instructions to be executed by the CPU. Computer 2500 also includes an I/O component 2560, supporting input/output flows between the computer and other components therein such as person interface elements 2580. Computer 2500 may also receive programming and data via network communications.

Hence, aspects of the methods of normalizing, ranking and blending disparate content from multiple different content sources, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other person profile and app management server into the hardware platform(s) of a computing environment or other system implementing a computing environment or similar functionalities in connection with person profile creation and updating techniques. Thus, other types of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or a physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, a hard a disk, a magnetic tape, any other magnetic medium, a CD-ROM, a DVD or a DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques of generating and providing query suggestions described herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for providing content, the method comprising:
   receiving a request for content from a person;
   constructing, via a person-centric system, a person centric space including a plurality of data sources, wherein information in each of the data sources is obtained by digesting and cross-linking information from a private space, a semi-private space, and a public space;
   estimating an intent of the person based on previous interactions of the person with the person centric space;
   obtaining first content from a first data source of the plurality of data sources based on the request;
   identifying one or more cross-linking keys from the first content;
   obtaining second content from a second data source of the plurality of data sources based on the identified cross-linking keys, the second data source being different than the first data source;
   extracting a first attribute set from the first content via a first model, and a second attribute set from the second content via a second model, wherein the first model and the second model are selected based on the first data source and second data source, respectively;
   determining, based on the first content and the second content, a feature space including a plurality of features;
   generating a first normalized feature set by mapping the first attribute set to the feature space;
   generating a second normalized feature set by mapping the second attribute set to feature space;
   determining, based on the first normalized feature set and the second normalized feature set, a rank score for each of the first content and the second content, wherein the rank score represents relevance of a corresponding content to the request;
   blending the first content and the second content to generate a blended content stream based on the estimated intent, wherein the first content and the second content are ranked in the blended content stream based on the rank scores; and
   generating an answer card to be provided to the person in response to the request, wherein the answer card includes the blended content stream.

2. The method of claim 1, wherein the first data source includes:
   private electronic mails;
   private calendar;
   private contact list;
   private messages;
   private bookmarks;
   private visual information;
   private voice information; and
   private log information.

3. The method of claim 1, wherein the second source includes one of:
   a semi-private data source; and
   a public data source.

4. The method of claim 3, wherein the semi-private data source includes:
   a social media data source; and
   a data sharing source.

5. The method of claim 1, wherein the blended content stream comprises:
   a first portion including the first content; and
   a second portion including the second content.

6. The method of claim 1, wherein the first and the second content are mixed in the blended content stream.

7. The method of claim 1, wherein the first attribute set is different than the second attribute set.

8. The method of claim 1, wherein the first attribute set is mapped to the feature space based on a set of rules.

9. The method of claim 1, wherein the first content is in a first format and the second content is in a second format that is different than the first format.

10. The method of claim 1, wherein a type of the answer card is determined based on the intent of the person.

11. The method of claim 1, wherein the answer card includes the blended content stream presented in a format that is determined based on a type of the answer card.

12. The method of claim 1, wherein the step of generating the answer card further comprises:
   determining a type of answer card to be provided to the person, wherein the type of answer card is determined based on the intent.

13. The method of claim 1, wherein
   the rank scores are content relevancy scores for the first content and the second content.

14. A system having at least one processor, storage, and a communication platform for providing content, the system comprising:
   an input request processing unit implemented on the at least one processor and configured to receive a request for content from a person;
   a person-centric index system implemented on the at least one processor and configured to construct a person centric space including a plurality of data sources, wherein information in each of the data sources is obtained by digesting and cross-linking information from a private space, a semi-private space, and a public space;
   an intent engine implemented on the at least one processor and configured to estimate an intent of the person based on previous interactions of the person with the person centric space;
   a first content retriever implemented on the at least one processor and configured to obtain first content from a first data source of the plurality of data sources based on the request, and
   identify one or more cross-linking keys from the first content;

a second content retriever implemented on the at least one processor and configured to obtain second content from a second data source of the plurality of data sources based on the identified cross-linking keys, the second data source being different than the first data source;
a content attribute extractor implemented on the at least one processor and configured to extract a first attribute set from the first content via a first model, and a second attribute set from the second content via a second model, wherein the first model and the second model are selected based on the first data source and second data source, respectively;
a feature space selector implemented on the at least one processor and configured to determine, based on the first content and the second content, a feature space including a plurality of features;
a feature generator implemented on the at least one processor and configured to
  generate a first normalized feature set by mapping the first attribute set the feature space, and
  generate a second normalized feature set by mapping the second attribute set to the feature space;
a content scoring engine implemented on the at least one processor and configured to determine, based on the first normalized feature set and the second normalized feature set, a rank score for each of the first content and the second content, wherein the rank score represents relevance of a corresponding content to the request; and
a blending engine implemented on the at least one processor and configured to:
  blend the first content and the second content to generate a blended content stream based on the estimated intent, wherein the first content and the second content are ranked in the blended content stream based on the rank scores, and
  generate an answer card to be provided to the person in response to the request,
wherein the answer card includes the blended content stream.

15. The system of claim 14, wherein the first data source includes:
  private electronic mails;
  private calendar;
  private contact list;
  private messages;
  private bookmarks;
  private visual information;
  private voice information; and
  private log information.

16. The system of claim 14, wherein the second source includes one of:
  a semi-private data source; and
  a public data source.

17. The system of claim 16, wherein the semi-private data source includes:
  a social media data source; and
  a data sharing source.

18. The system of claim 14, wherein the blended content stream comprises:
  a first portion including the first content; and
  a second portion including the second content.

19. The system of claim 14, wherein the first and the second content are mixed in the blended content stream.

20. A non-transitory machine-readable medium having information recorded thereon for providing query suggestions, wherein the information, when read by the machine, causes the machine to perform operations comprising:
  receiving a request for content from a person;
  constructing, via a person-centric system, a person centric space including a plurality of data sources, wherein information in each of the data sources is obtained by digesting and cross-linking information from a private space, a semi-private space, and a public space;
  estimating an intent of the person based on previous interactions of the person with the person centric space;
  obtaining first content from a first data source of the plurality of data sources based on the request;
  identifying one or more cross-linking keys from the first content;
  obtaining second content from a second data source of the plurality of data sources based on the identified cross-linking keys, the second data source being different than the first data source;
  extracting a first attribute set from the first content via a first model, and a second attribute set from the second content via a second model, wherein the first model and the second model are selected based on the first data source and second data source, respectively;
  determining, based on the first content and the second content, a feature space including a plurality of features;
  generating a first normalized feature set by mapping the first attribute set to the feature space;
  generating a second normalized feature set by mapping the second attribute set to the feature space;
  determining, based on the first normalized feature set and the second normalized feature set, a rank score for each of the first content and the second content, wherein the rank score represents relevance of a corresponding content to the request;
  blending the first content and the second content to generate a blended content stream based on the estimated intent, wherein the first content and the second content are ranked in the blended content stream based on the rank scores; and
  generating an answer card to be provided to the person in response to the request, wherein the answer card includes the blended content stream.

21. The medium of claim 20, wherein the first data source includes:
  private electronic mails;
  private calendar;
  private contact list;
  private messages;
  private bookmarks;
  private visual information;
  private voice information; and
  private log information.

22. The medium of claim 20, wherein the second source includes one of:
  a semi-private data source; and
  a public data source.

23. The medium of claim 22, wherein the semi-private data source includes:
  a social media data source; and
  a data sharing source.

24. The medium of claim 20, wherein the blended content stream comprises:
  a first portion including the first content; and
  a second portion including the second content.

25. The medium of claim 20, wherein the first and the second content are mixed in the blended content stream.

* * * * *